(12) United States Patent  
Lau et al.

(10) Patent No.: US 11,899,774 B2  
(45) Date of Patent: Feb. 13, 2024

(54) METHOD AND APPARATUS FOR DETERMINING AUTHENTICITY OF AN INFORMATION BEARING DEVICE

(71) Applicant: INFOTOO INTERNATIONAL LIMITED, Hong Kong (HK)

(72) Inventors: Tak Wai Lau, Hong Kong (HK); Wing Hong Lam, Hong Kong (HK)

(73) Assignee: INFOTOO INTERNATIONAL LIMITED, Hong Kong (HK)

( * ) Notice: Subject to any disclaimer, the term of this patent is extended or adjusted under 35 U.S.C. 154(b) by 678 days.

(21) Appl. No.: 16/977,100

(22) PCT Filed: Mar. 1, 2019

(86) PCT No.: PCT/IB2019/051653  
§ 371 (c)(1),  
(2) Date: Sep. 1, 2020

(87) PCT Pub. No.: WO2019/167007  
PCT Pub. Date: Sep. 6, 2019

(65) Prior Publication Data  
US 2020/0410510 A1   Dec. 31, 2020

(30) Foreign Application Priority Data  
Mar. 1, 2018   (HK) .................................. 18102975.5

(51) Int. Cl.  
*G06K 9/00*   (2022.01)  
*G06F 21/44*   (2013.01)  
(Continued)

(52) U.S. Cl.  
CPC .............. *G06F 21/44* (2013.01); *G06N 3/08* (2013.01); *G06Q 30/0185* (2013.01); *G06T 9/002* (2013.01)

(58) Field of Classification Search  
CPC ...... G06F 21/44; G06N 3/08; G06Q 30/0185; G06T 9/002  
See application file for complete search history.

(56) References Cited

U.S. PATENT DOCUMENTS 6,456,729 B1 * 9/2002 Moore ............. G07B 17/00435  
235/491  
7,364,072 B1 * 4/2008 Moore ................... G06Q 10/08  
235/383  
(Continued)

FOREIGN PATENT DOCUMENTS

CN   105631296 A   6/2016  
CN   106228142 A   12/2016  
(Continued)

OTHER PUBLICATIONS

Sharma, Ashlesh, et al. "The fake vs real goods problem: microscopy and machine learning to the rescue." Proceedings of the 23rd ACM sigkdd international conference on knowledge discovery and data mining. 2017. (Year: 2017).*  
(Continued)

*Primary Examiner* — Avinash Yentrapati

(57) ABSTRACT

An authentication apparatus and a method to devise an authentication tool is provided for facilitating determination of authenticity or genuineness of an article with reference to a captured image or a purported primary image of an information bearing device on the article. The authenticity or genuineness of an article is determined with reference to whether a captured image is a primary image of an authentic information bearing device using a trained neural network. The neural network is trained using training images comprising imperfect images having varying degrees of image imperfections which are introduced under controlled conditions.

20 Claims, 17 Drawing Sheets

(51) Int. Cl.
*G06N 3/08* (2023.01)
*G06Q 30/018* (2023.01)
*G06T 9/00* (2006.01)

(56) References Cited

U.S. PATENT DOCUMENTS

| | | | |
|---|---|---|---|
| 10,019,654 B1* | 7/2018 | Pisoni | G06V 10/82 |
| 10,691,943 B1* | 6/2020 | Ferstl | G06V 20/13 |
| 10,810,725 B1* | 10/2020 | Dolhansky | G06V 10/764 |
| 2003/0197878 A1* | 10/2003 | Metois | H04N 1/32256 |
| | | | 358/1.9 |
| 2005/0038756 A1* | 2/2005 | Nagel | G06K 19/086 |
| | | | 705/76 |
| 2017/0032285 A1* | 2/2017 | Sharma | G06N 3/08 |
| 2017/0046563 A1 | 2/2017 | Kim et al. | |
| 2017/0243058 A1 | 8/2017 | Tan et al. | |
| 2019/0295302 A1* | 9/2019 | Fu | G06V 10/82 |
| 2021/0327041 A1* | 10/2021 | Asendorf | G06T 7/0002 |
| 2022/0406029 A1* | 12/2022 | Huber, Jr. | G06V 10/993 |

FOREIGN PATENT DOCUMENTS

| | | |
|---|---|---|
| WO | 2015092694 A1 | 6/2015 |
| WO | 2015157526 A1 | 10/2015 |

OTHER PUBLICATIONS

European Extended Search Report for European Patent Application No. 19761199.9 dated Mar. 19, 2021.
Atoum, Yousef et al: "Face Anti-Spoofing Using Patch and Depth-Based CNNs", 2017 IEEE International Joint Conference On Biometrics (IJCB), Oct. 1, 2017, pp. 319-328, XP055783469.
Qian, Yinlong et al: "Deep learning for steganalysis via convolutional neural networks", Proceedings of Spie, IEEE, US, vol. 9409, Mar. 4, 2015, pp. 94090J-1-94090J-10, XP060050907.
Goodfellow: "Regularization for Deep Learning", Feb. 20, 2018, XP055783462, URL: https://www.deeplearningbook.org/contents/regularization.html.
International Search Report for PCT/IB2019/051653 dated Jun. 27, 2019.

* cited by examiner

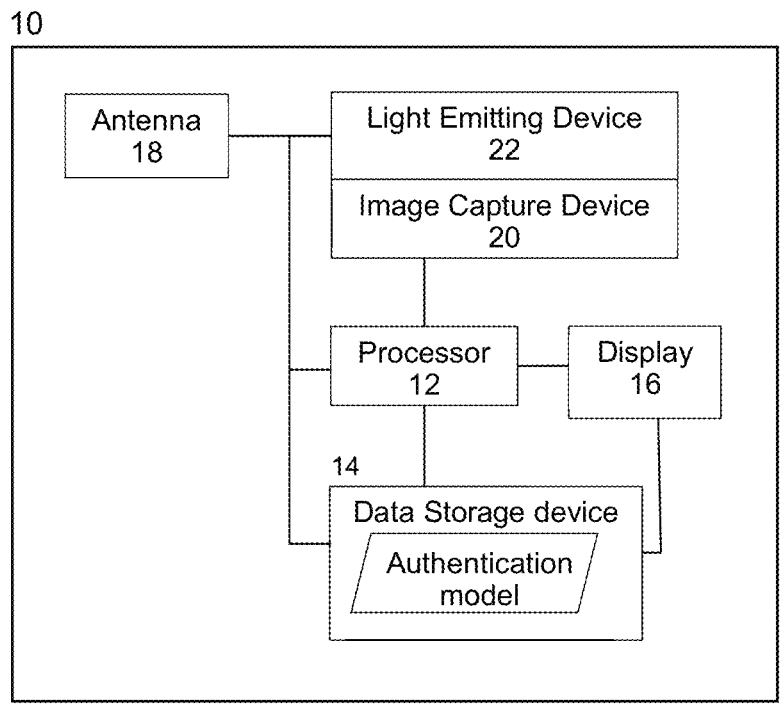
Fig. 1
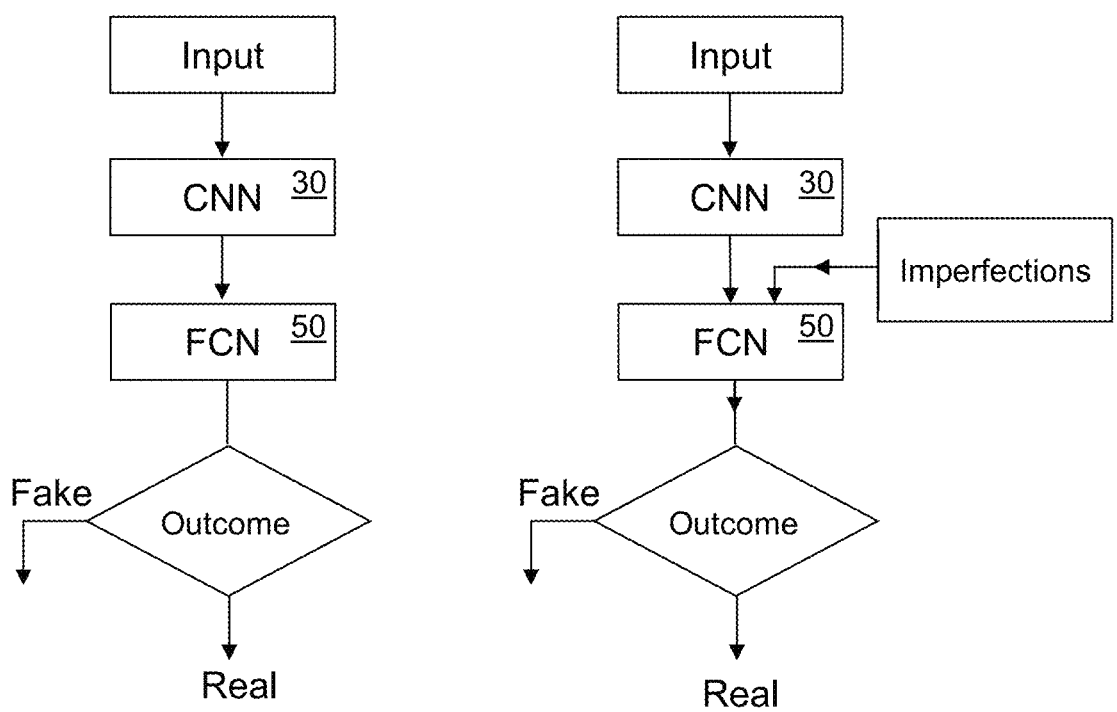
Fig. 2A
Fig. 2B

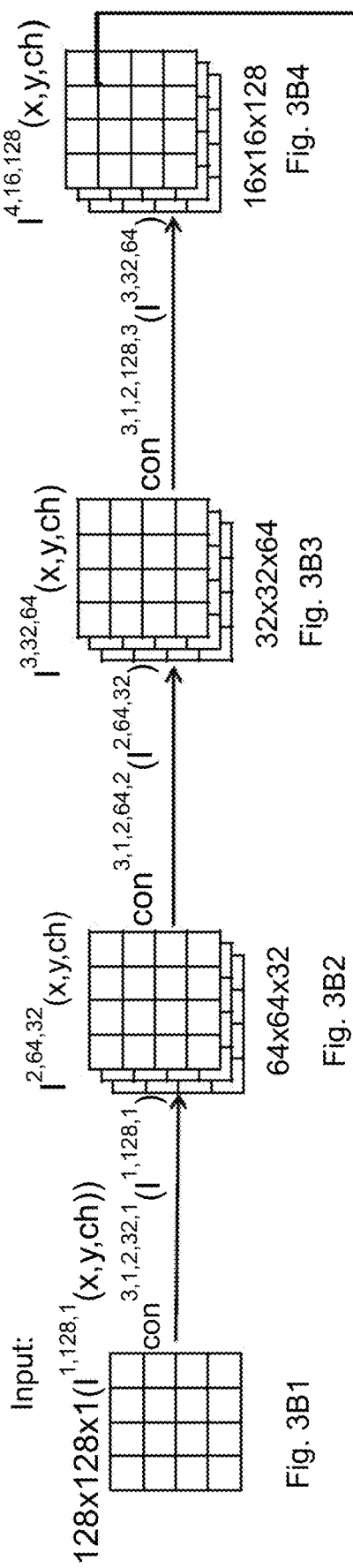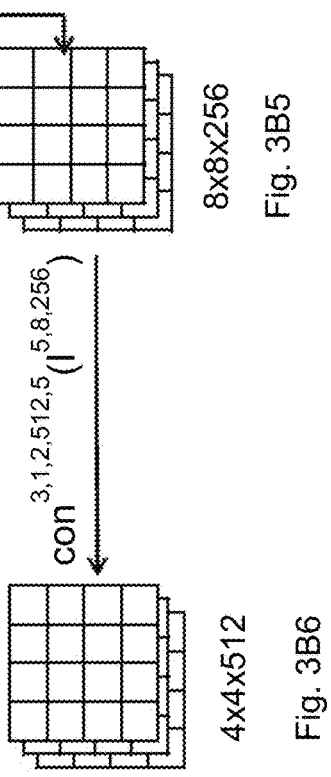

f(x, y)

$\|F(u, v)\|$

Figure 3:
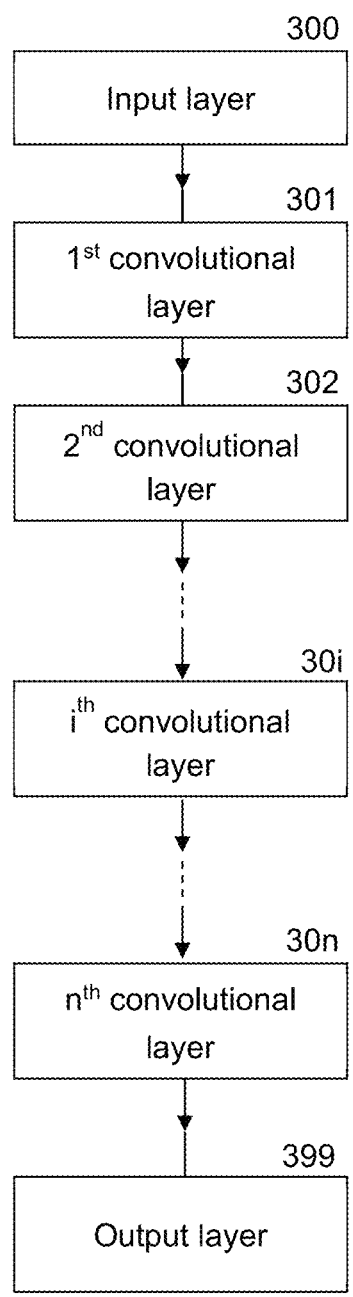

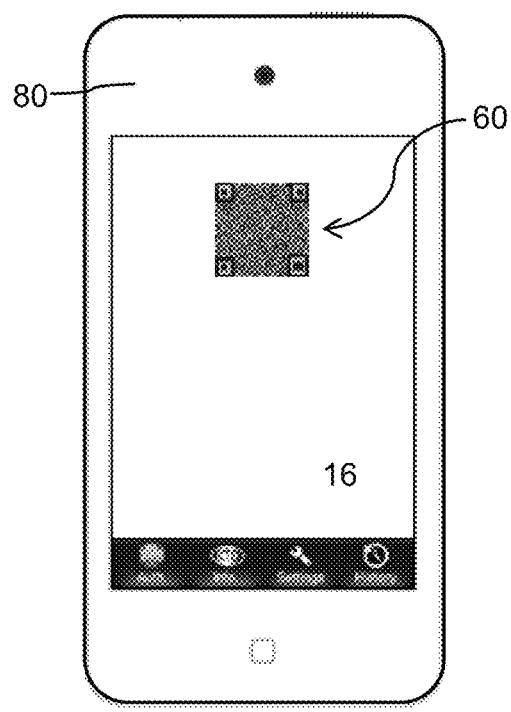
Fig. 5A
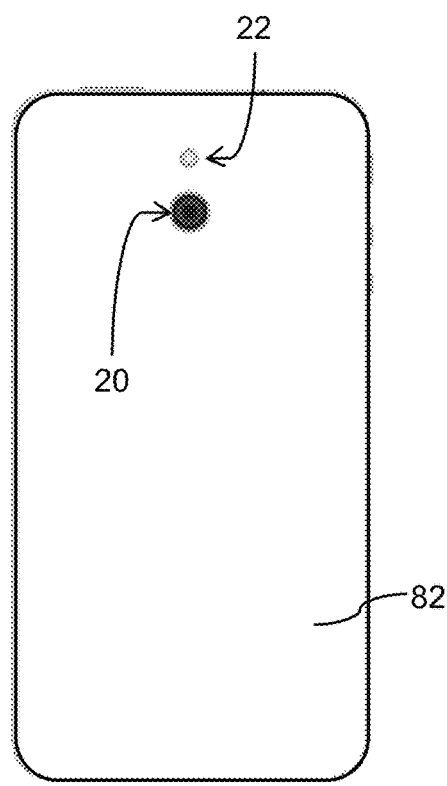
Fig. 5B
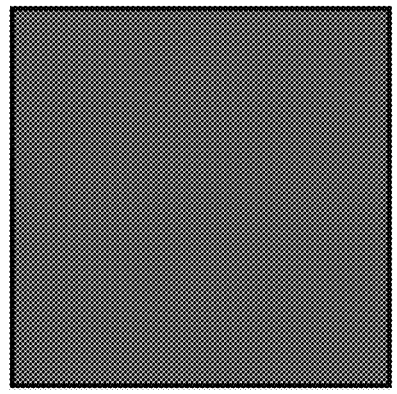
Fig. 6A1
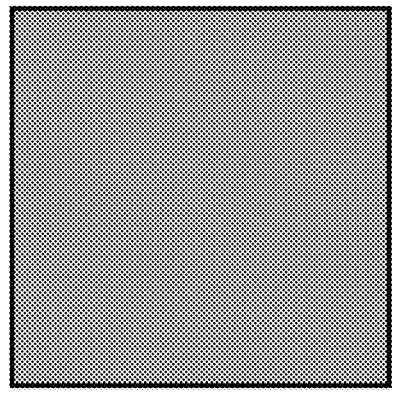
Fig. 6A2
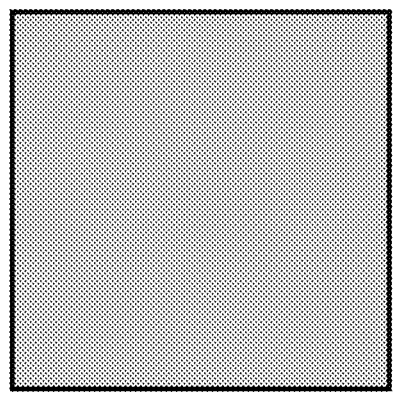
Fig. 6A3

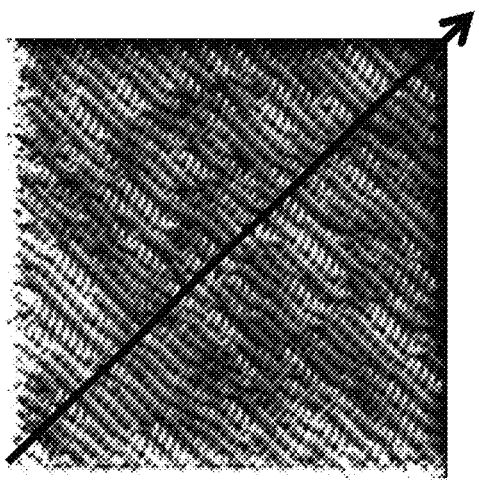
Fig. 6B1
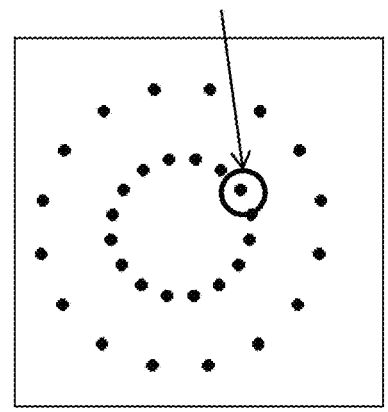
Fig. 6B1'
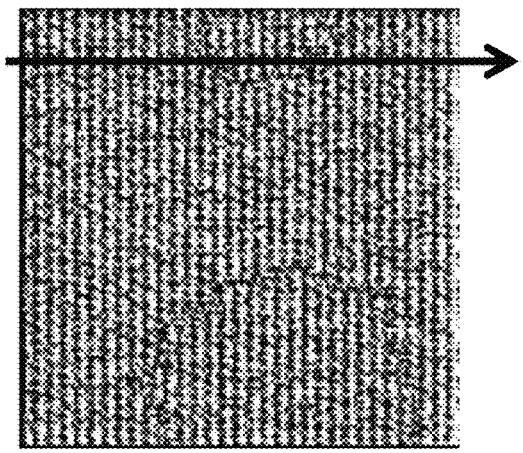
Fig. 6B2
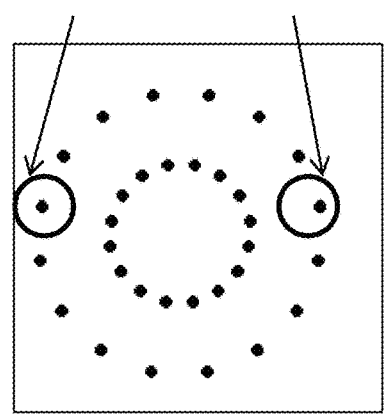
Fig. 6B2'
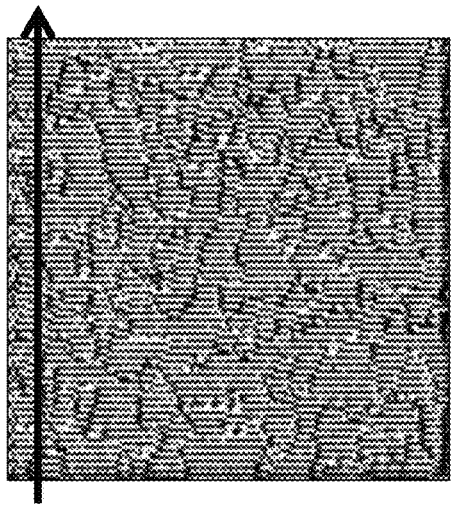
Fig. 6B3
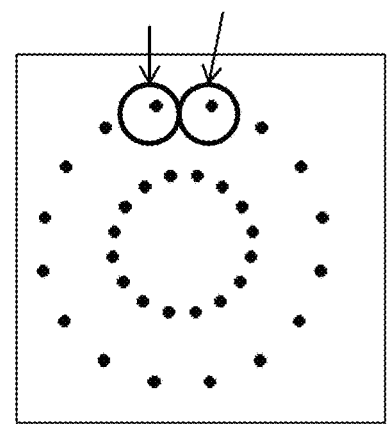
Fig. 6B3'

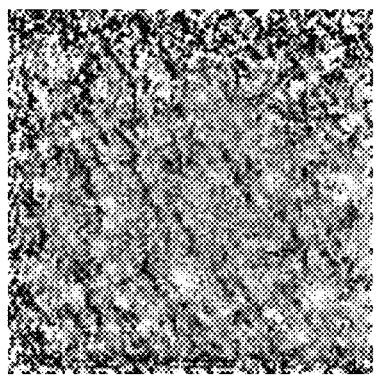
Fig. 6C1
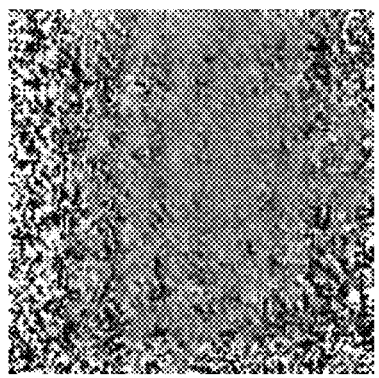
Fig. 6C2
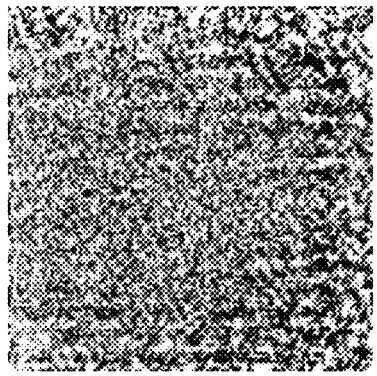
Fig. 6C3

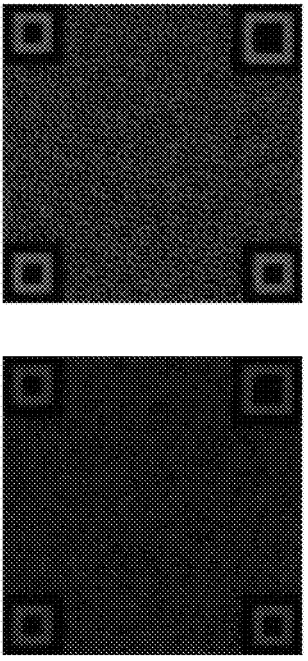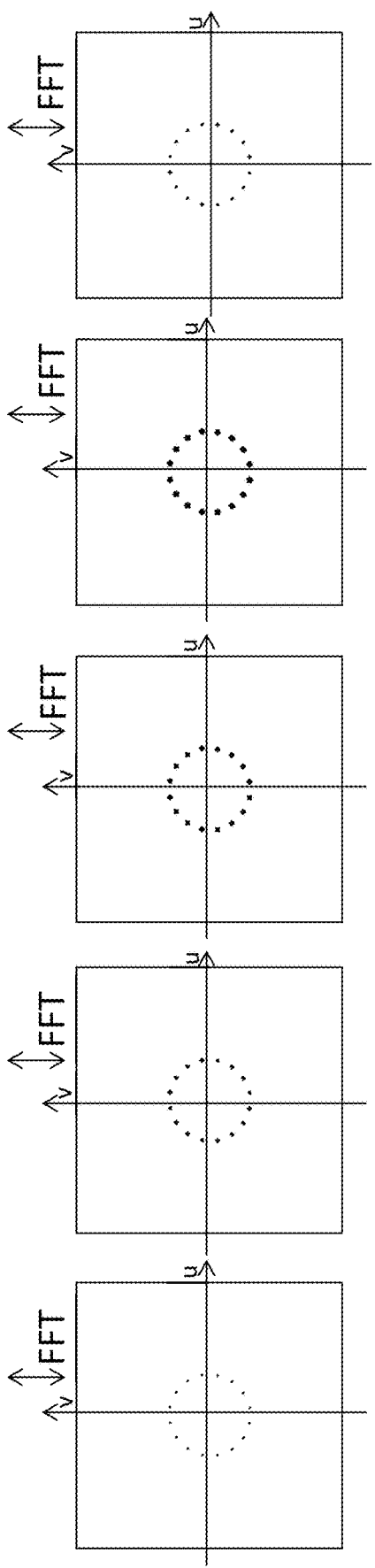
Fig. 7A1 — Lightness of 19, Signal strength at 200LPI: 4.8
Fig. 7A2 — Lightness of 45, Signal strength at 200LPI: 17.68
Fig. 7A3 — Lightness of 147, Signal strength at 200LPI: 33.65
Fig. 7A4 — Lightness of 192, Signal strength at 200LPI: 40.29
Fig. 7A5 — Lightness of 252, Signal strength at 200LPI: 14.04
Fig. 7A11  Fig. 7A21  Fig. 7A31  Fig. 7A41  Fig. 7A51

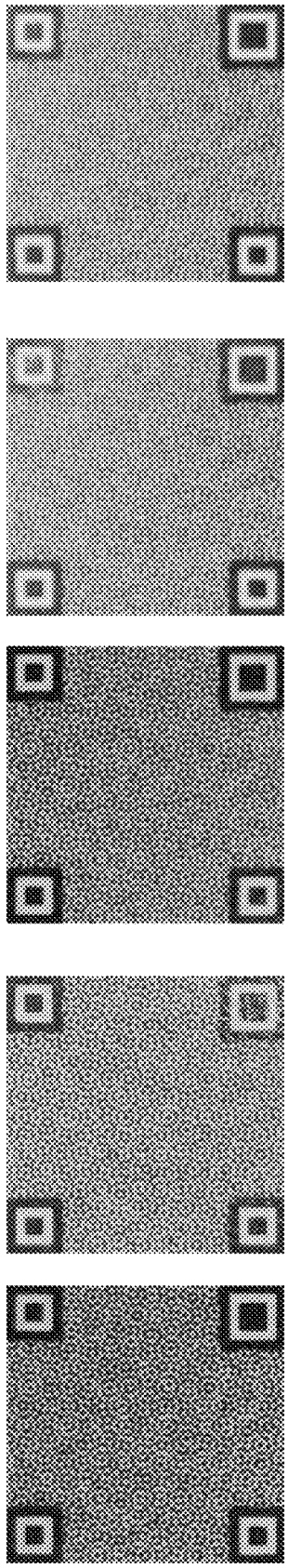
Fig. 8A1  Fig. 8A2  Fig. 8A3  Fig. 8A4  Fig. 8A5
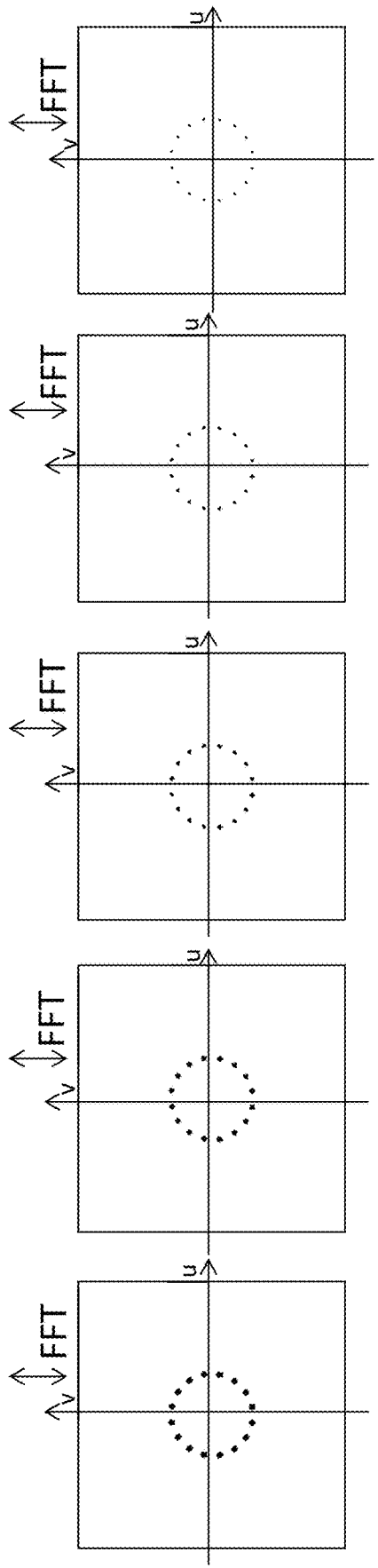
Fig. 8A11  Fig. 8A21  Fig. 8A31  Fig. 8A41  Fig. 8A51

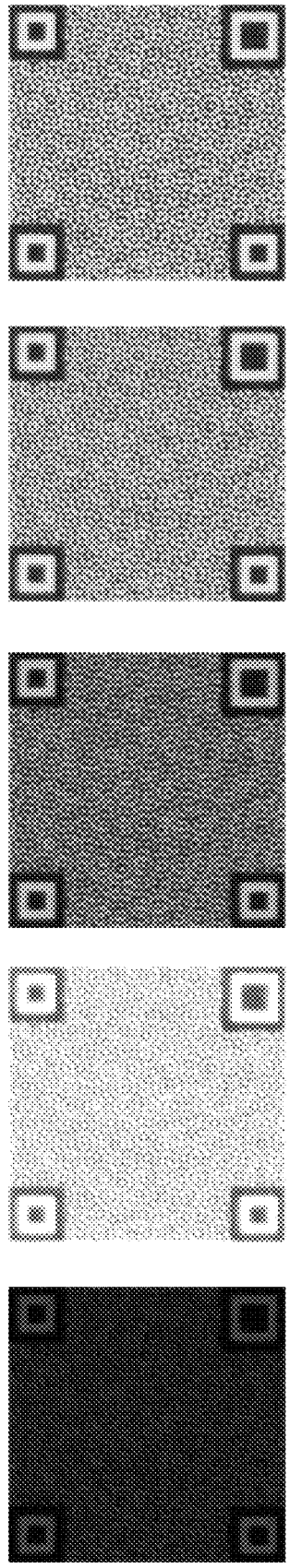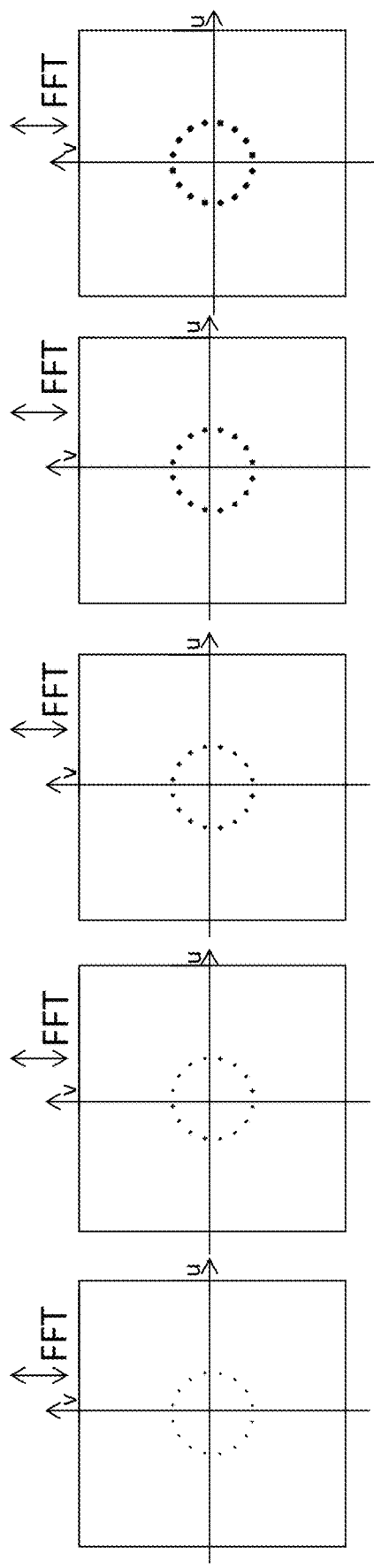

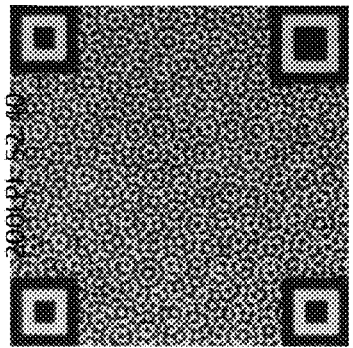
Darker printing density
Signal strength at
100LPI: 43.02
200LPI: 52.40
Fig. 10A3
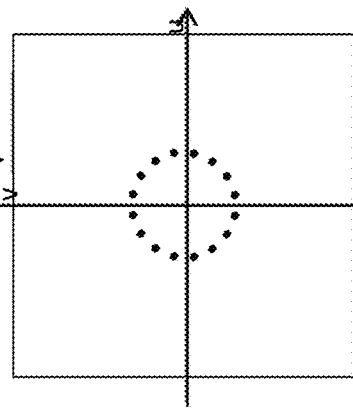
Fig. 10A31
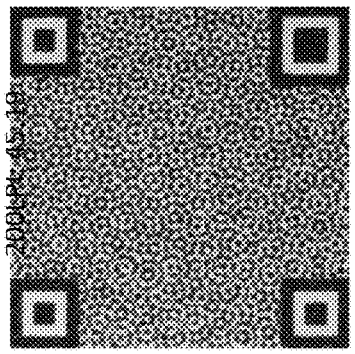
Intermediate printing density
Signal strength at
100LPI: 42.62
200LPI: 45.19
Fig. 10A2
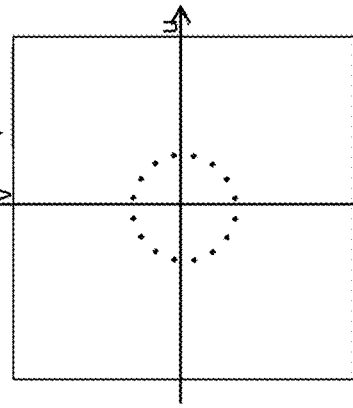
Fig. 10A21
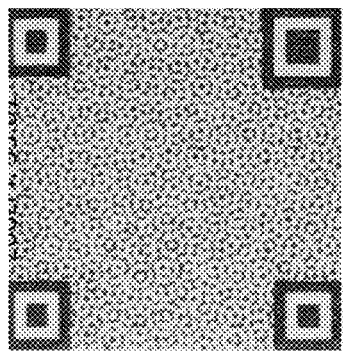
Lighter printing density
Signal strength at
100LPI: 39.97
200LPI: 35.01
Fig. 10A1
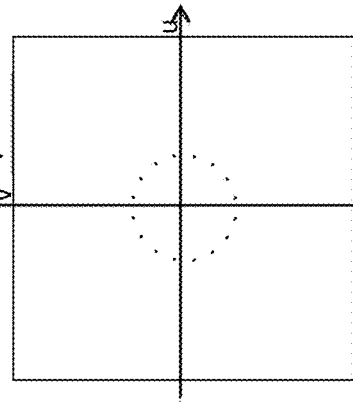
FIG. 10A11

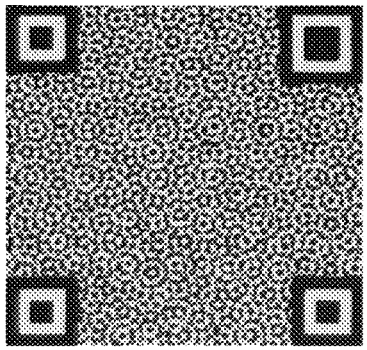
Smoother texture
Signal strength at
100LPI: 43.97
200LPI: 55.44
Fig. 11A3
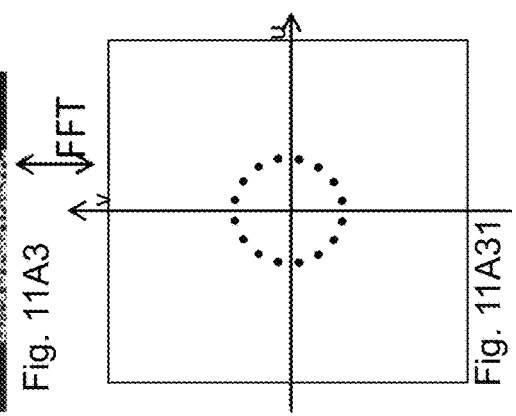
Fig. 11A31
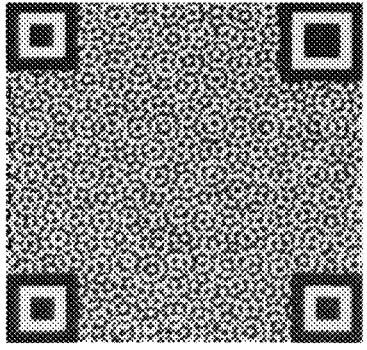
Intermediate texture
Signal strength at
100LPI: 43.05
200LPI: 51.72
Fig. 11A2
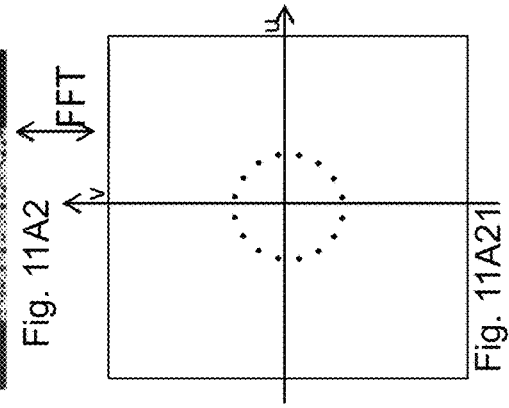
Fig. 11A21
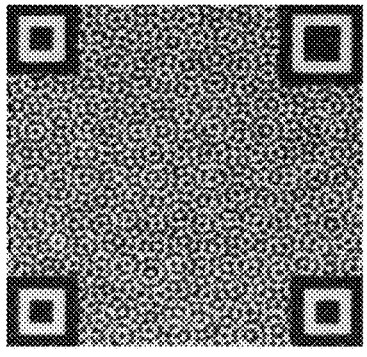
Rougher texture
Signal strength at
100LPI: 42.62
200LPI: 45.19
Fig. 11A1
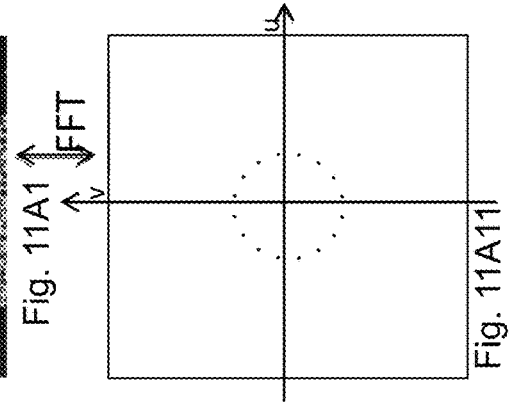
Fig. 11A11

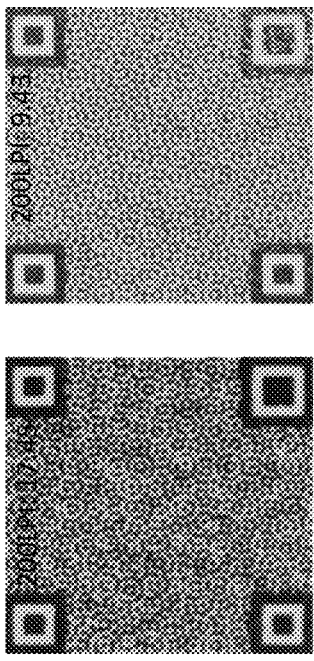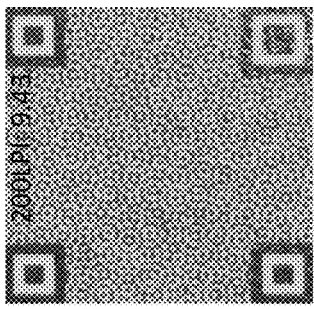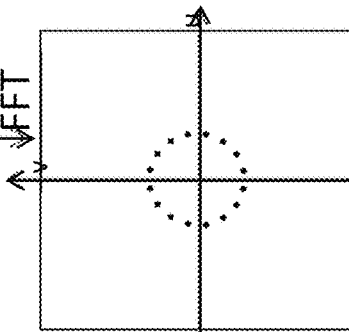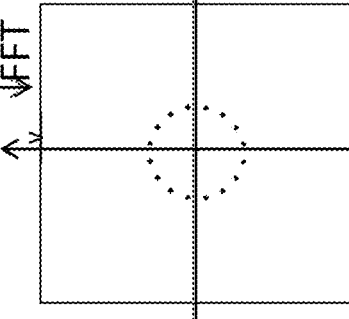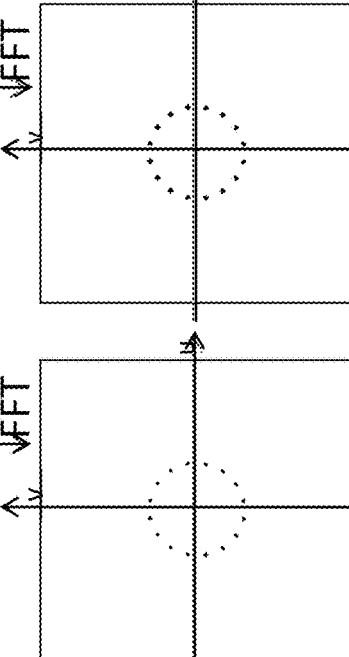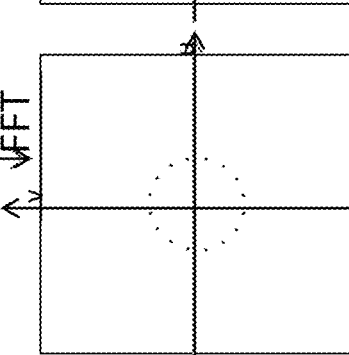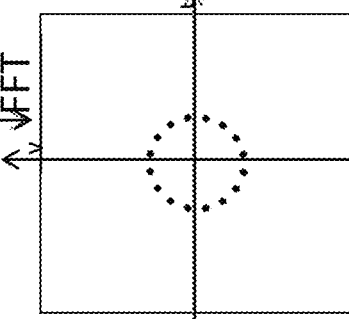

METHOD AND APPARATUS FOR DETERMINING AUTHENTICITY OF AN INFORMATION BEARING DEVICE

FIELD

The present disclosure relates to methods and apparatus for determining authenticity of an information bearing device.

BACKGROUND

Counterfeiting is a major problem adversely affecting business concerns and people of many countries. Many counterfeiting activities involve copying of articles and identification materials such as labels, packaging, products, and/or certificates attached to or relating to such articles. Anti-counterfeiting means and devices have been devised to combat counterfeiting or as means to control flow of genuine goods. Anti-counterfeiting devices are also known as authentication devices and the terms are used interchangeably herein. Data-coded image patterns have been incorporated into product or article identification materials to function as anti-countering devices or part thereof. A typical data-coded image pattern of an authentication device usually comprises non-human readable or non-human perceivable transformed authentication data which are embedded in a background device. A background device may be or may include a picture, a figure, a photograph, a drawing, a word, a mark, a sign, a symbol, etc. As the transformed authentication data are non-human readable or non-human perceivable, machines, for example microprocessor-based machines, are commonly used to facilitate determination of authenticity of a device purporting to be an authentic authentication device.

During authentication operations, authentication machines usually require presentation of an authentication device to the machine. The machine captures an image of the authentication device and performs operations to analyze and determine whether the captured image corresponds to an authentic authentication device or a non-authentic authentication device. A non-authentic authentication device may be a copy of an authentic authentication device or a fake authentication device.

Data-coded image patterns of authentication devices are formed with ever increasingly higher resolution with ever increasingly higher definition of details in order to outperform counterfeiting means and equipment of ever-increasing sophistication and fidelity, and this race is expected to continue.

However, with the increasingly higher definition of the data-coded image patterns, it has become increasingly difficult even for microprocessor-based authentication machines to differentiate between an authentic authentication device and a non-authentic authentication device which is a high-fidelity reproduction of an authentic authentication device, for example, due to limitation in image capturing processes by human operators.

DISCLOSURE

An authentication tool, an authentication apparatus and a method to devise an authentication tool for facilitating determination of authenticity or genuineness of an article with reference to a captured image or a purported primary image of the article using a neural network is disclosed. To facilitate verification of authenticity of an article, an article is commonly incorporated with an authentication device which includes an information bearing device such as a label, a tag or an imprint. The information bearing device comprises a data-embedded image pattern and the data-embedded image pattern is covertly encoded with a set of data so that the data is not perceivable by a reasonable person reading the data-embedded image pattern. In example embodiments. Each data is a discrete data having characteristic two- or three-dimensional coordinate values in data domain and the coordinate values are transformed into spatial properties of image-defining elements which cooperate to define the entirety of the data-embedded image pattern. The spatial properties include, for example, brightness or amplitude of an image-defining element at a specific set of coordinates on the data domain. The data may be covertly coded by a transformation function which operate to spread the coordinate values of a data into spatial properties spread throughout the image-defining elements. The set of data or each individual discrete data point has characteristic signal strengths. The authenticity or genuineness of an article is determined with reference to whether a captured image is a primary image of an authentic information bearing device. In example embodiments, the authentication tool comprises a neural network structure. The neural network structure may comprise an input layer, an output layer and a plurality of neural network layers intermediate the input layer and the output layer. The neural network may have a different structure due to advance in technology as time effluxes. Each example neural network layer has a set of filters comprising a plurality of learned filters. Each learned filter comprises a plurality of filter elements and each filter element has a filter value. The learned filters and filter values are composed or constituted by computer based-deep-learning using a plurality of training images. The training images may comprise a plurality of primary images of the data-embedded image pattern and a plurality of non-primary images of the data-embedded image pattern of the data-embedded image pattern. The training images comprises imperfect images having varying degrees of image imperfections. The image imperfections are controlled imperfections which are intentionally introduced into the imperfect images under controlled conditions in the course of image capture processes or due to different image capture conditions. The image imperfections are controlled within acceptable ranges which would facilitate meaningful training and determination of authenticity. Images having imperfections at a degree outside the acceptable range or ranges are not used for training the neural network.

Experiments showed that an authentication tool obtained by training a neural network using a large number of training images, say, several thousand training images, having controlled image imperfections substantially increases recognition rate and reliability of determination.

In some embodiments, the neural network is a convolutional neural network (CNN).

In some embodiments, the image imperfections comprise imperfections in brightness, contrast, blurriness, image pixel dimension and/or background noise.

In some embodiments, the imperfections comprise imperfections in brightness, and the imperfections in brightness are measured with respect to a reference brightness of the authentic information bearing device; and the imperfections in brightness include deviation of brightness from the reference brightness due to illumination settings, exposure setting, or other lighting settings of an image capture apparatus.

In some embodiments, the imperfections comprise imperfections in contrast, and the imperfections in contrast are measured with respect to a reference contrast of the authentic information bearing device; and the imperfections in contrast include deviation of contrast from the reference contrast due to illumination settings, exposure setting, or other lighting settings of an image capture apparatus; or due to texture of a formation medium on which the data-embedded image pattern is fixed.

In some embodiments, the imperfections comprise imperfections in blurriness, and the imperfections in blurriness are measured with respect to a reference blurriness of the authentic information bearing device; and the imperfections in blurriness include deviation of blurriness from the reference blurriness due to focus settings or focusing limitation of an image capture apparatus, due to focusing distance or focusing defects of a user operator during image capture, or due to texture of a formation medium on which the data-embedded image pattern is fixed.

In some embodiments, each type of imperfection is within a prescribed range having an upper limit and/or a lower limit, and the prescribed range is selected according to trainability of the CNN.

In some embodiments, the data-embedded image pattern comprises a set of encoded data, wherein the encoded data is a discrete data which is spread and distributed in the data-embedded image pattern as a spread pattern which is non-human readable or non-human perceivable; and the set of encoded data has a characteristic signal strength, and the characteristic signal strengths of the primary images of the data-embedded image pattern are above a signal strength threshold which is a threshold of trainability of the CNN.

In some embodiments, the set of data embedded in the data-embedded image pattern comprises a plurality of discrete data, and the discrete data are transformed into spatially distributed pattern defining elements which are spread in the data-embedded image pattern and which are non-human readable or non-human perceivable using naked eyes.

In some embodiments, the set of data embedded in the data-embedded image pattern comprises a plurality of discrete frequency data, and the discrete frequency data are transformed into spatially distributed pattern defining elements which are spread in the data-embedded image pattern and which are non-human readable or non-human perceivable using naked eyes; and the spatially distributed pattern defining elements and the discrete frequency data are correlated by Fourier transform.

In some embodiments, the set of data embedded in the data-embedded image pattern comprises a first plurality of frequency data, and the frequency data have a first characteristic frequency and different angles with respect to a set of frequency axes.

In some embodiments, the set of data embedded in the data-embedded image pattern comprises a second plurality of frequency data, and the frequency data have a second characteristic frequency and different angles with respect to the set of frequency axes, the second characteristic frequency being lower than the first characteristic frequency.

In some embodiments, the first characteristic frequency is at or above 100 LPI.

In some embodiments, the second characteristic frequency is at or below 200 LPI.

In some embodiments, the set of data embedded in the data-embedded image pattern comprises a plurality of frequency data and the frequency data have a characteristic frequency, wherein the frequency data are definable on a frequency domain plane and adjacent frequency data have an angular separation of 22.5° or less on the frequency domain plane.

In some embodiments, the input layer comprises one or a plurality of channels, and the channel has 128×128 pixels or less.

In some embodiments, the output layer comprises a plurality of channels, and each channel has 4×4 feature data or less.

In some embodiments, the CNN comprises four convolutional layers.

In some embodiments, the convolutional layers are sequentially connected and each convolutional layer comprises a number of channels defining a plurality of channels, and the number of channels of a convolutional layer increases on progressing from the input layer to the output layer.

In some embodiments, each channel has a number of feature data defining a plurality of feature data, and the number of feature data per channel decreases on progressing from the input layer to the output layer.

In some embodiments, the tool comprises an FCN and output of the CNN is to input to the FCN, and the FCN is to process the input and gives an output of probability of authenticity.

In some embodiments, the tool is storable as a set of computer executable instructions.

There is disclosed an authentication apparatus comprising a microprocessor, a display, a data storage device, and an authentication tool stored in the data storage device.

In some embodiments, the apparatus comprises an image capturing device, and the microprocessor is operable to execute stored instructions to obtain an image of the purported information bearing device.

The term imperfection herein and the associated term imperfect is a relative and non-absolute term.

For example, where the best blurriness of a primary image that can be obtained by using a reference authentication apparatus is say around 1-2, a blurriness level of 1-2 is regarded as perfect, while a blurriness level higher than 2 is regarded as imperfect.

For example, where the best signal strength under best capturing condition for data $D_1$ is 45.17, a signal strength below the best signal strength is regarded as an imperfect condition.

For example, where the contrast value of an original or a primary copy of data-embedded image pattern is C, a deviation from C is regarded as imperfect.

For example, where the brightness (or lightness) level of an original or a primary copy of data-embedded image pattern is B, a deviation from B is regarded as imperfect.

For example, where the data-embedded image pattern has N×M pixels, an image pattern captured by a variant image capture device having N'×M' pixels, where N≠N' or M≠M' is regarded as imperfect.

In this specification, a data-code image pattern and a data-embedded image pattern are used interchangeably. The authentication apparatus may be a smart phone or other portable apparatus loaded with an application software containing authentication tool or instructions of the disclosure.

FIGURES

Figure 3A:
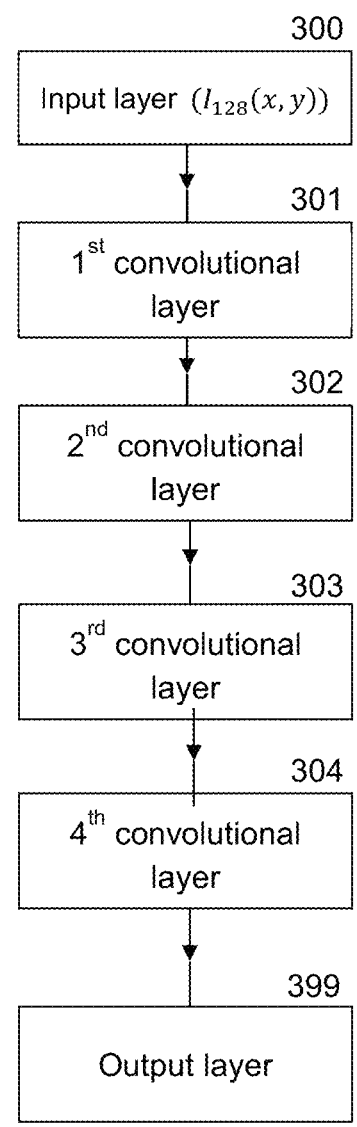
Figure 3C:
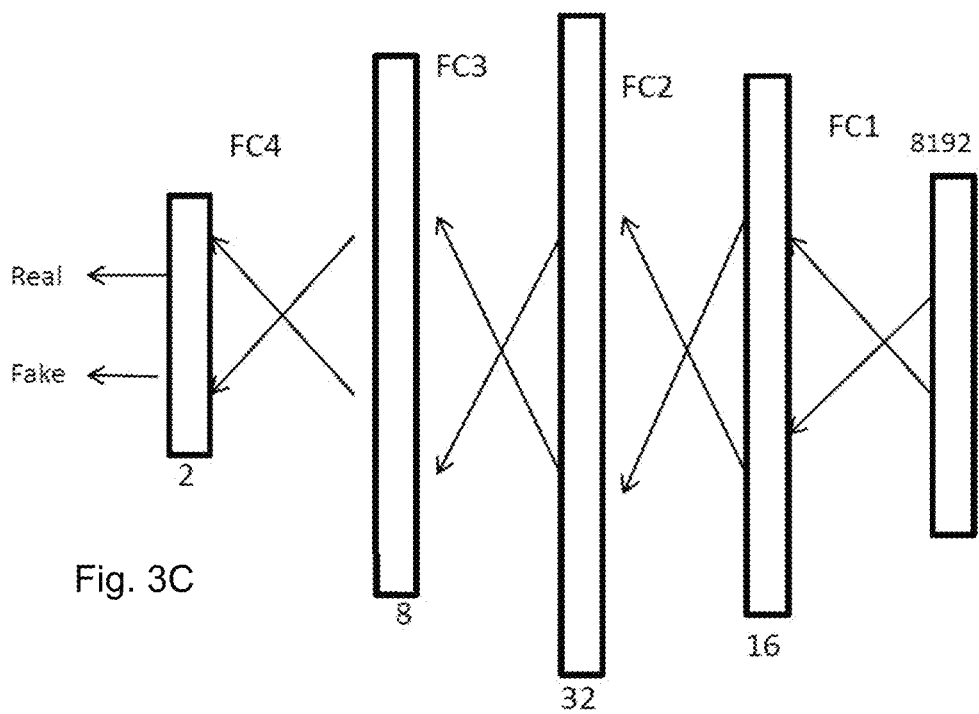
Figure 3D:
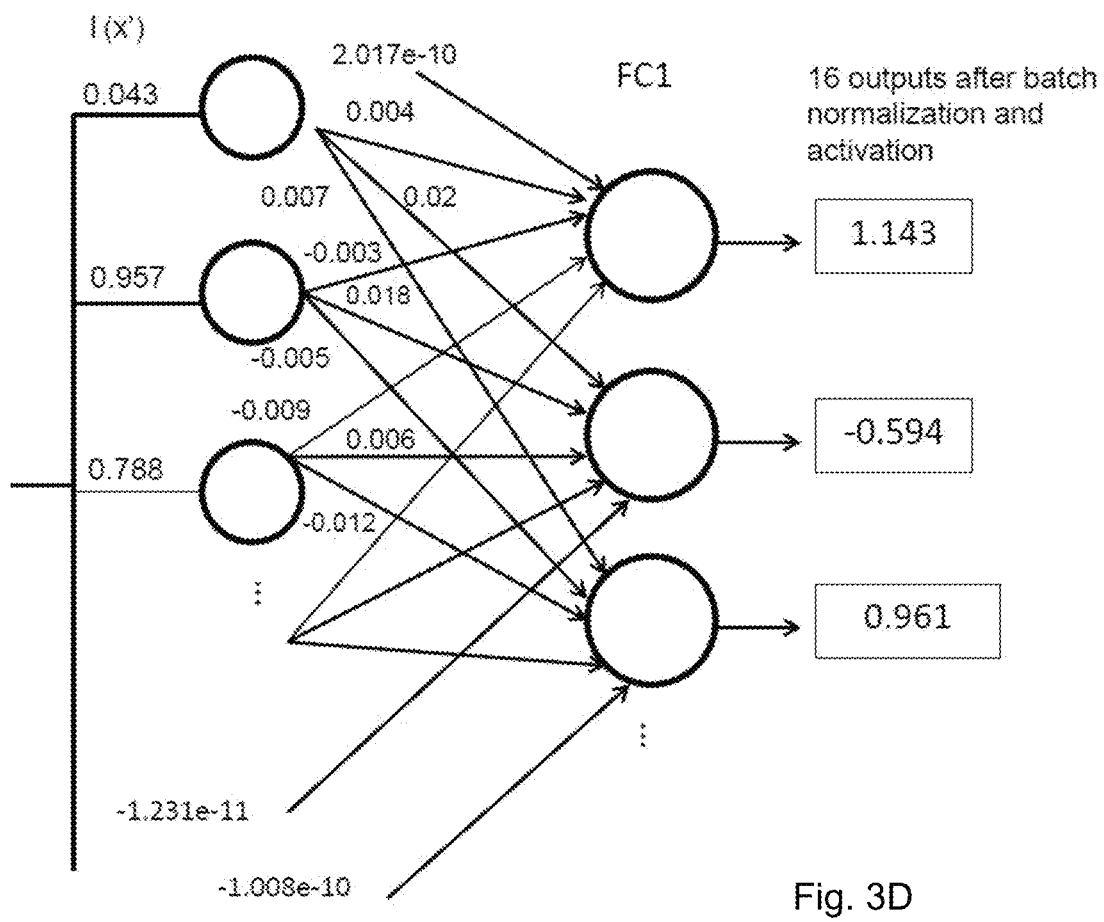
Figure 4A:
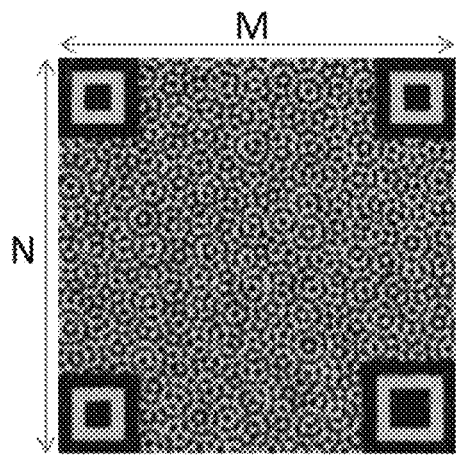
Figure 4B:
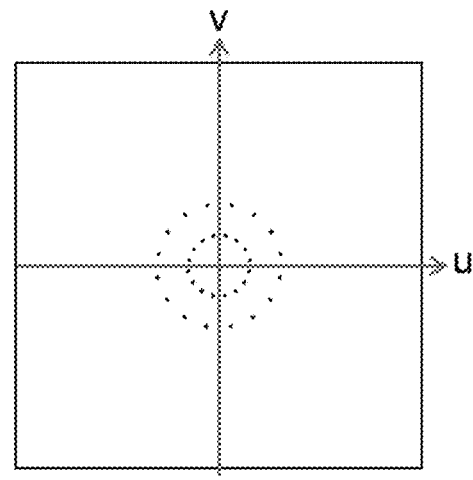
Figure 4C:
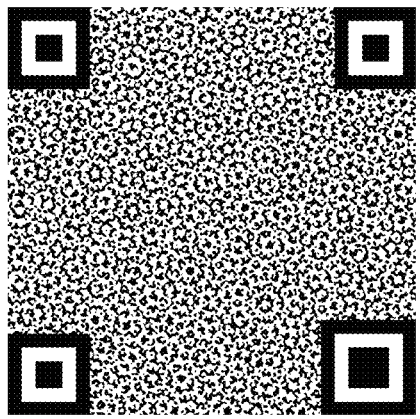
Figure 13:
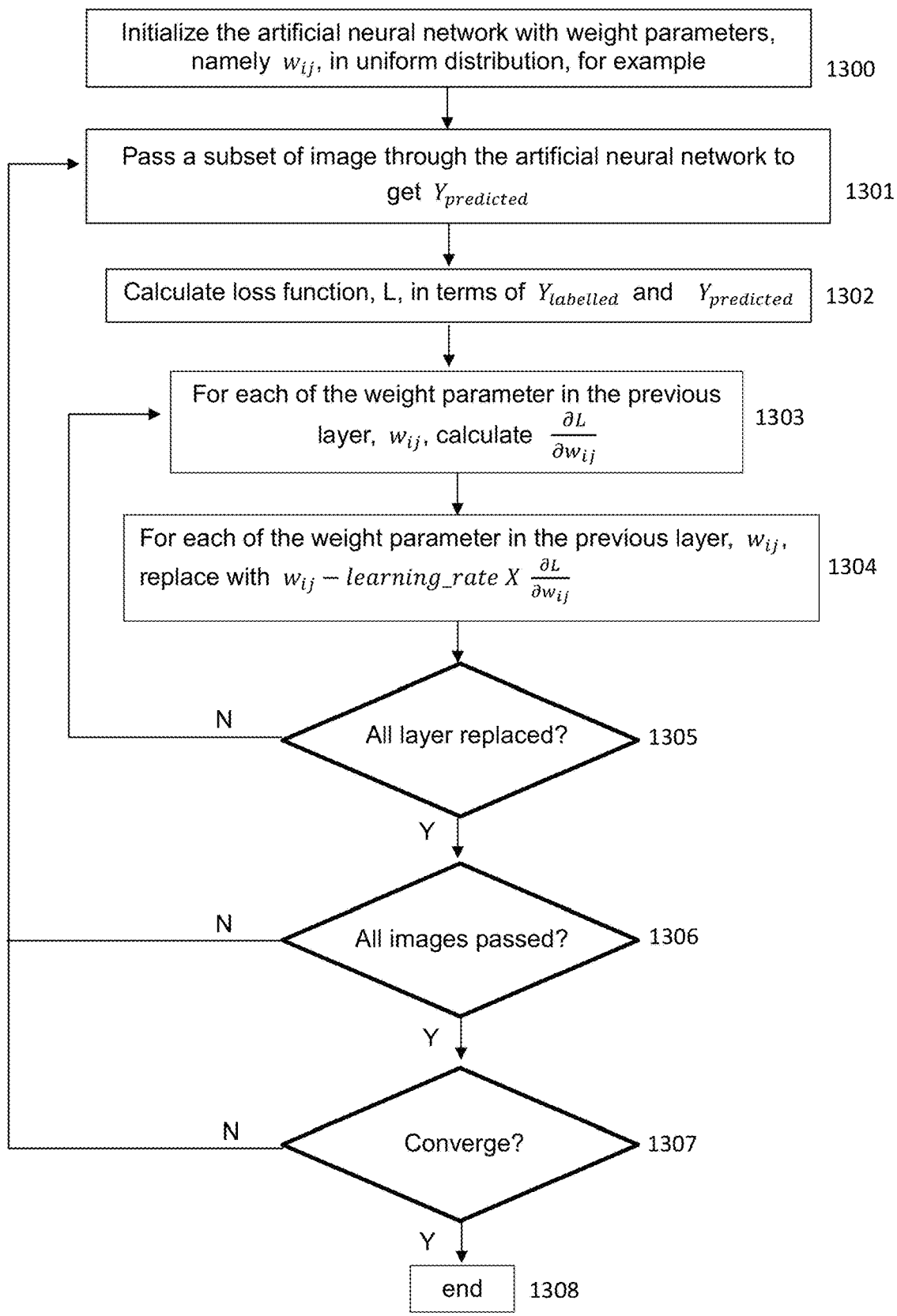
Figure 14A:
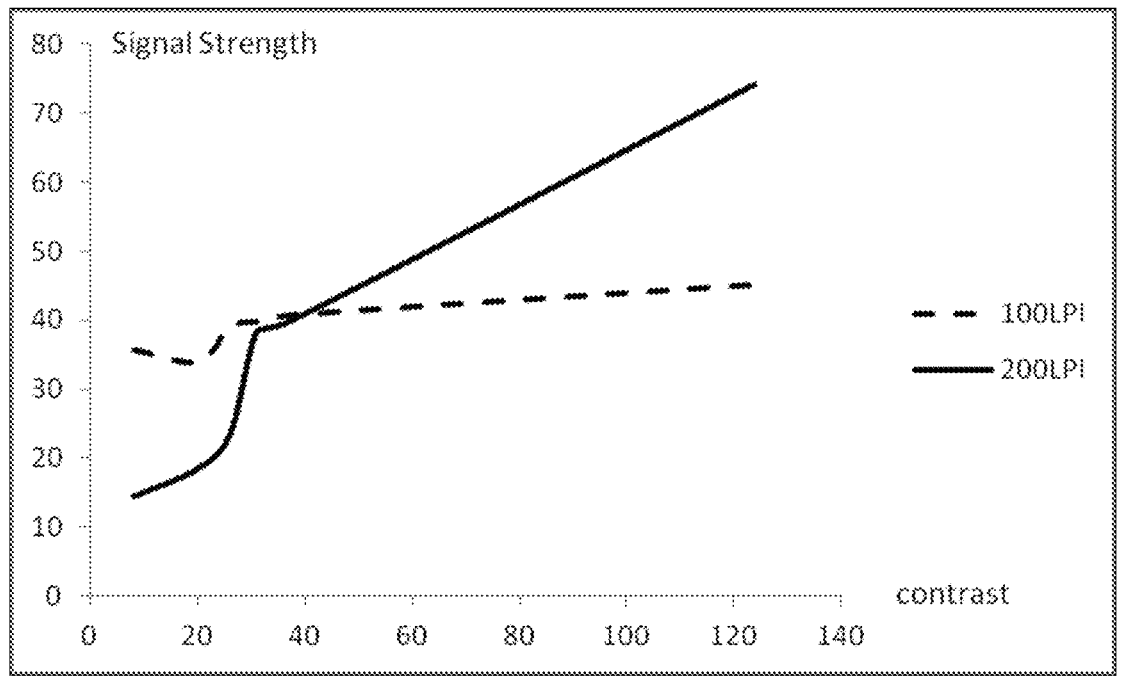
Figure 14B:
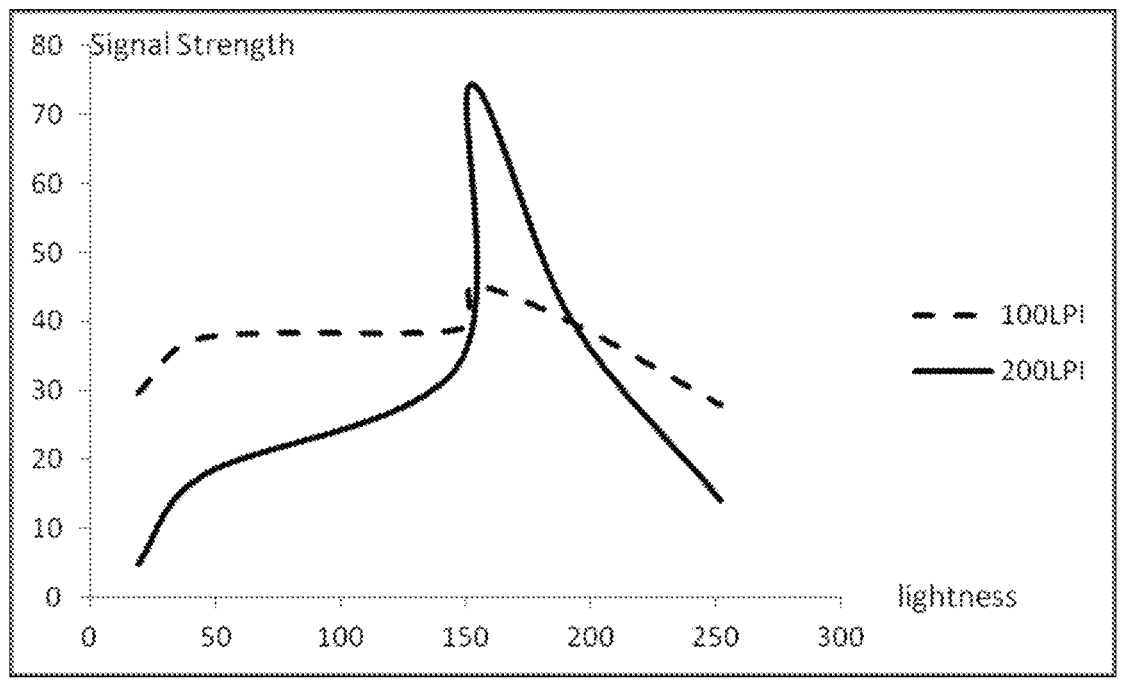
Figure 14C:
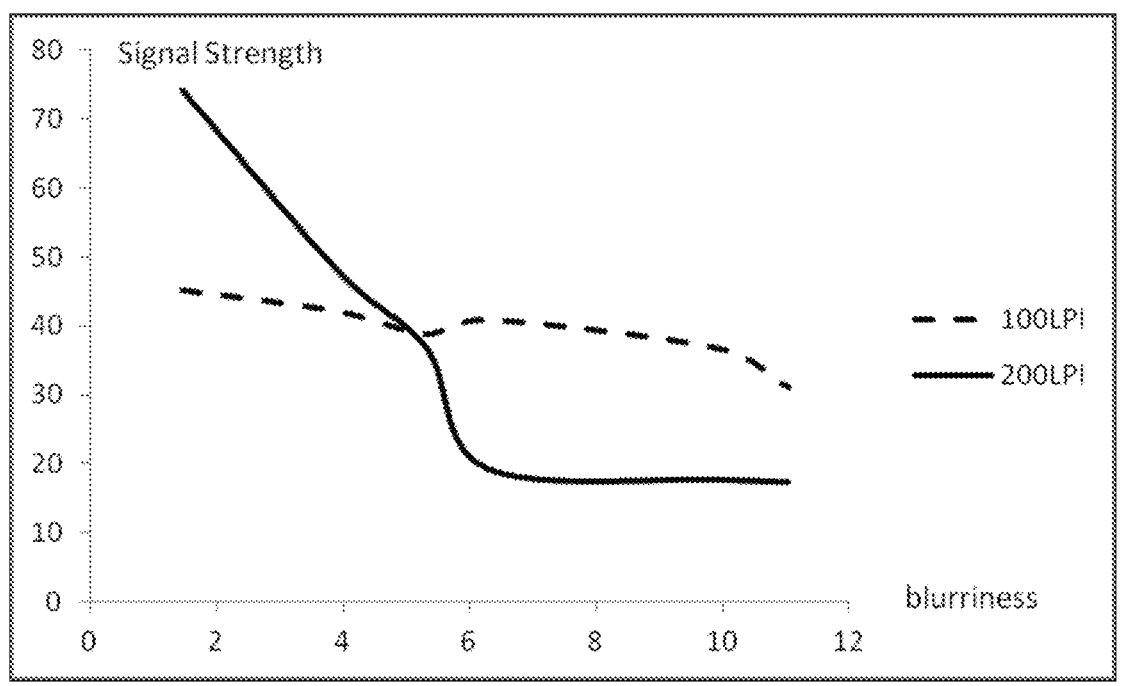

The disclosure will be described by way of example and with reference to the accompanying figures, in which FIG. 1 block diagram of an example authentication apparatus according to the disclosure, FIGS. 2A and 2B are example flow diagrams of methods of authentication, FIG. 3 is an example CNN comprising an example plurality of n convolution layers between the input layer and the output layer of the present disclosure, FIG. 3A is an example CNN implemented in an example authentication apparatus comprises an example plurality of four convolution layers between the input layer and the output layer, FIGS. 3B1-3B6 are schematic diagrams of the example component layers of the CNN of FIG. 3A, FIG. 3C is a schematic diagram of an FCN connected to the CNN of FIG. 3A, CNN of FIG. 3A, FIG. 3D is s schematic diagram depicting example processing at input of FC1 of FIG. 3C, FIG. 4A is an example information bearing device for determination of authenticity for use in the disclosure, FIG. 4B is a data domain diagram showing authentication data of the example information bearing device in a data domain, FIG. 4C is the authentic data-embedded image pattern of the example information bearing device in FIG. 4A, FIGS. 5A and 5B are front and rear views of an example authentication apparatus in the form of a smart phone, FIGS. 6A1, 6A2 and 6A3 are example images formed from processed features maps of the $1^{st}$ convolutional layer of the CNN of FIG. 3A, FIGS. 6B1, 6B2 and 6B3 are example images formed from processed features maps of the $2^{nd}$ convolutional layer of the CNN of FIG. 3A, FIGS. 6B1', 6B2' and 6B3' depict corresponding frequency data of FIGS. 6B1, 6B2 and 6B3, FIGS. 6C1, 6C2 and 6C3 are example images formed from processed features maps of a subsequent convolutional layer of the CNN of FIG. 3A, FIGS. 7A1, 7A2, 7A3, 7A4 and 7A5 are examples of appearance of an authentic information bearing device under different lightness conditions when viewed through an image capture device, FIGS. 7A11, 7A21, 7A31, 7A41 and 7A51 are data domain representations of the information bearing device of FIGS. 7A1, 7A2, 7A3, 7A4 and 7A5, FIGS. 8A1, 8A2, 8A3, 8A4 and 8A5 are examples of appearance of an authentic information bearing device having different blurriness when viewed through an image capture device, FIGS. 8A11, 8A21, 8A31, 8A41 and 8A51 are data domain representations of the information bearing device of FIGS. 8A1, 8A2, 8A3, 8A4 and 8A5, FIGS. 9A1, 9A2, 9A3, 9A4 and 9A5 are examples of appearance of an authentic information bearing device having different contrasts when viewed through an image capture device, FIGS. 9A11, 9A21, 9A31, 9A41 and 9A51 are data domain representations of the information bearing device of FIGS. 9A1, 9A2, 9A3, 9A4 and 9A5, FIGS. 10A1, 10A2 and 10A3 are examples of appearance of an authentic information bearing device having different printing densities when viewed through an image capture device, FIGS. 10A11, 10A21 and 10A31 are data domain representations of the information bearing device of FIGS. 10A1, 10A2 and 10A3, FIGS. 11A1, 11A2 and 11A3 are examples of appearance of an authentic information bearing device having different printing medium textures when viewed through an image capture, FIGS. 11A11, 11A21 and 11A31 are data domain representations of the information bearing device of FIGS. 11A1, 11A2 and 11A3, FIGS. 12A1, 12A2, 12A4, 12A4 and 12A5 are examples of appearance of a non authentic information bearing device having different blurriness when viewed through an image capture device, FIGS. 12A11, 12A21, 12A31, 12A41 and 12A51 are data domain representations of the information bearing device of FIGS. 12A1, 12A2, 12A4, 12A4 and 12A5, FIG. 13 is a flow chart depicting training process of neural network, and FIGS. 14A, 14B and 14C are graphs showing relations between signal strength vs contrast, lightness and blurriness respectively.

DESCRIPTION

An example authentication apparatus 10 comprises a processor 12, a data storage device 14, a display device 16, a communication frontend device 18, an image capture device 20 and a light emitting device 22, as depicted in FIG. 1. The processor 12 may be a solid-state device such as a microprocessor, a multi-core microprocessor, an array or cluster of microprocessors, an array or cluster of multi-core microprocessors, or other forms of microprocessors or solid-state processors without loss of generality. The image capture device 20 and the light emitting device 22 are optional devices to facilitate capturing of an image of a target where necessary or desired. In some applications, the apparatus is to capture an image of a target using the image capture device 20. The captured image of the target is used for instantaneous analyses and determination of authenticity of the target. A target herein includes a target article or part thereof. An image of a target herein is a target image which is to be analyzed to facilitate, for example, verification or determination of authenticity of the target. In some applications, the apparatus is to receive a target image from another apparatus or another source. In some embodiments, the apparatus 10 is to receive a target image or target images from an external source, for example, via the communication frontend device 18 or from a portable storage device such as a USB-type memory stick. Irrespective of the source of the target image, the apparatus is to execute stored instructions to verify or determine authenticity of the target on the bases of a target image or target images.

The apparatus 10 is stored with a set of authentication instructions. The authentication instructions may be stored on the data storage device 14. The data storage device may comprise volatile memories such as RAM and non-volatile memories such as ROM, SSD (solid state drive) or HDD (hard disk drive).

To perform authentication operations, the microprocessor 12 is to load the stored authentication instructions from the non-volatile data storage portion of the data storage device 14, to activate and execute the loaded authentication instructions so that the apparatus enters into an authentication mode, and then to operate the apparatus as an authentication machine. When in the authentication mode, the apparatus 10 is operable to perform authentication operations on a target image, whereby authenticity of the source of the target image is verified or determined. In most example applications, the target image is purported to be a direct image of an authentic authentication device. A direct image of a source means the image is obtained directly from the source without intervening copying, that is, the image is not captured from an image of the source. An example source may be an information bearing device which is covertly coded with a security data designed to function as an authentic authentication device. The authentic authentication device is a target for the purpose of the present disclosure and the source is therefore also a target. The covertly coded data is typically not human readable or perceivable and the data coding may be by means of steganographic techniques such as transform domain coding techniques. Example transform domain coding schemes include data transformation coding by using Fourier transform, Bessel transform, Henkel transform, cosine transform or other transform functions. Example transform functions or transformation functions suitable for covert data coding for security applications, including authentication applications for the present disclosure, are characterized by the capability to transform a discrete data into an image pattern defined by a plurality of pattern-defining elements, wherein the pattern-defining elements are spread or distributed through-out the pattern, defined by a pattern boundary, to define spatial distribution properties and/or characteristics of the pattern. In example embodiments, the discrete data comprises a set of data. The set of data may comprise a single discrete data or a plurality of discrete data. Each data is a data that can be represented or characterized by a set of data coordinates in the data domain A data in the domain can be represented with reference to a pair of orthogonal data domain axes u, v. In example embodiments, each data may be a data point that can be represented by a set of data coordinates, for example, a set of multiple-dimensional coordinates such as 2-dimensional or 3-dimensional coordinates. The image pattern is a data-coded image pattern obtained by transformation of the set of data in the data domain into the plurality of image-defining elements distributed throughout the pattern boundary. The spatial properties and characteristics of the data-code image pattern, and those of the plurality of distributed image-defining elements, are determined by the coordinates of the discrete data forming the set of data. In some embodiments, for example, in examples using Fourier transform, the spatial properties and characteristics of the data-code image pattern, and those of the plurality of distributed image-defining elements defining the data-coded image pattern, formed by transformation operation on a set of data comprising a plurality of discrete data, and those formed by superimposition of image patterns formed by transformation operations individually on each of the plurality of discrete data individually, are the same.

An example information bearing device herein comprises a data-encoded image pattern which is encoded with a set of discrete data. The set of data is human non-perceivable in its encoded state such that the data is not readily readable or readily decodable by a human reader looking at the data-encoded image pattern using naked eyes. The data-encoded image pattern is formed collectively by a plurality of pattern defining elements which are distributed or spread spatially according to its data coordinates to correspond to the set of data. The set of data may comprise a plurality of discrete data and each discrete data has a specific corresponding set of distributed or spread properties due to its coordinate values. For example, a data and a corresponding image pattern formed by transformation operation on the data may be uniquely correlated by a transformation function or having properties described herein or an inverse transformation function of the transformation function. In example embodiments, a set of discrete data, expressible as a plurality of data points having individual data coordinates in a first domain u, v, has a corresponding image pattern defined by a set of image-defining elements, the image-defining elements having continuous and amplitude varying properties, for example, oscillatory amplitude properties or asymptotic oscillatory amplitude properties distributed or spread in a second domain x, y, which is a spatial domain of the image pattern. For example, the set of discrete data may comprise a plurality of frequency domain data in the frequency domain (say, first domain) and the data-encoded image pattern has continuous and varying amplitude properties which are distributed or spread in the spatial domain (say, second domain). The continuous and varying amplitude properties which are distributed or spread in the spatial domain are referred to herein as transformed domain properties.

Due to its unique properties, for example, a specific or one-to-one correspondence between a set of data and a set of spatial image pattern having spread or distributed pattern defining elements to represent the set of data, the information bearing device can be used as an authentication device, with the encoded coordinate data or encoded set of coordinate data functioning as a security data or a security feature. An authentication device herein comprises an information bearing device and is also referred to as an authentication mark, an authentication information bearing device. Where an information bearing device containing a data-coded image pattern is used as an authentication device, the data-coded image pattern will function as an anti-counterfeiting mark and the encoded data will function as an authentication data.

An authentic authentication device herein is also referred to as an authentic information bearing device or a genuine information bearing device herein, while a non-authentic authentication device is also referred to as a non-authentic information bearing device or a non-genuine information bearing device where appropriate. The target image may be captured by the apparatus or received from an outside source.

During authentication operations, the apparatus 10 is to operate as an authentication machine comprising or resembling a convolutional neural network ("CNN") 30 in combination with a fully connected network ("FCN") 50, as depicted in FIG. 2.

An example CNN 30 comprises an input layer 300, an output layer 399, and a plurality of convolutional layers 301-30n interconnecting the input layer 300 and the output layer 399. CNN is a class of deep, feed-forward, artificial neural networks in machine learning. Each convolutional layer 301, . . . , 30i, . . . , 30n comprises a set of channels and a set of learned filters. A channel is also referred to as a feature map or an activation map. Each channel comprises a set of feature data having a data size. The feature map is two-dimensional and the set of feature data has a matrix width (or width in short) and a matrix height (or height in short). Each feature data is referred to as a neuron. The convolutional layers are sequentially connected in series. Each convolutional layer is to apply a convolutional operation to its input and to pass results of the convolutional operation to the next layer. The process is described as a convolutional operation in neural networks, which is mathematically a cross-correlation operation. Channels of a or the same convolutional layer have the same data size, that is, they have the same number of data or neurons. The convolutional layers are sequentially organized and convolution output of a previous layer is input for a next or subsequent layer, and the output layer is the last layer of the CNN. The convolutional layers are structured such that a channel of a subsequent layer has a lesser number of data than a channel of an earlier layer, and the number of channels of a subsequent layer is larger than the number of channels of a previous layer. Conversely, a channel of an earlier layer has a larger number of data than a channel of a subsequent layer, and the number of channels of a previous layer is smaller than the number of channels of a subsequent layer. As the number of channels increases on progressing from the input layer to the output layer, the number of filters also increases on progressing from the input side to the output side of the CNN.

Each channel is associated with a set of filters and each filter is a weighting template comprising a plurality of weighting factors and the weighting factors are learned weighting factors which were obtained by learning prior to implementation of the authentication tool. As the number of channels decreases while the number of channels increases on progressing from the input side to the output side, the number of filters also increases on progressing from the input side to the output side.

During forward pass, each filter is convolved across the width and height of the input volume, which is a feature map of the previous layer, computing the dot product between the entries of the filter and the input layer and producing a 2-dimensional activation map of that filter.

In the above example CNN, the convolution layers are sequentially connected in series. However, in some embodiments, at least some of the convolution layers may be interconnected or connected recurrently. The layers in the above example CNN are structured such that a channel of a subsequent layer has a lesser number of data than a channel of an earlier layer and the number of channels of a subsequent layer is larger than the number of channels of a previous layer. However, in some embodiments, a channel of a subsequent layer may have a larger number or some number of data than a channel of an earlier layer and the number of channels of a subsequent layer is larger than the number of channels of a previous layer, and in some embodiments, the number of channels of a subsequent layer may be less than or equal to the number of channels of a previous layer. In the example CNN, the number of filters increases on progressing from the input side to the output side. However, in some embodiments, the number of filters may decrease or stay the same on progressing from the input side to the output side The fully connected network ("FCN") is connected to output of the CNN, such that output of the CNN is fed as input to the FCN, as depicted in FIG. 2. The FCN will perform classification operations on the processed data of the CNN, for example, to determine whether, or how likely, the processed data of a target image CNN corresponds to an authentic authentication device or a non-authentic authentication device.

An example CNN of an example authentication apparatus comprises a plurality of convolution layers between the input layer and the output layer, as depicted in FIG. 3. The convolution layers of the CNN are serially connected to form an ensemble of serially connected convolution layers. Each convolution layer comprises a plurality of filters, and each filter is a convolution filter which is to operate with an input data file to generate an output data file. A plurality of output data files is generated as a result of convolution operations among the convolution filters and the input data files at the input of a convolution layer. Each output data file is referred to as a feature map in CNN terminology. Therefore, the feature maps are data files which are products of convolutional operations (that is, correlation operations) between the convolution filters and the input data files, wherein each input data file is also referred to as an input matrix. An input data file presented at the input of a first convolution layer of the CNN is intended to be a data file of a target image containing a plurality of image data representing a plurality of image-defining elements. Each image-defining element has spatial properties and characteristics such that the spatial properties and characteristics of all the image-defining elements of a target image define the entirety of the target image. The spatial properties and characteristics include spatial coordinates and signal amplitude or strength of the image-defining elements. Where a target image is digitally captured or stored, each image-defining element is stored as a pixel in a data file. An image, or more specifically a target image, is at least two dimensional. Therefore, the pixels of an image are typically arranged as a 2- or 3-dimensional data file or data matrix, with a specific pixel identifiable with reference to its position in the image, for example, with reference to its spatial coordinates, for example, in row and column numbers, on the image.

Each output data file of a convolution layer has a smaller data file size than its input data file while is presented at the input of the convolution layer. In general, salient features are extracted during convolution operations so that a feature map contains salient features extracted from the input file or makes salient features more prominent, but with less details. Each feature map, as a data file, when reconstructed as a 2- or 3-dimensional data file or data matrix correlating to the input data file and presented on a display device appears as a visible image.

A data file of a target image presented at the 1$^{st}$ convolution layer is transformed into a plurality of output data files at the output of the 1$^{st}$ convolution layer. Each data file at the output of the 1$^{st}$ convolution layer is a feature map having a data size which is smaller than the input data file, while the number of output data file is a multiple of the number of input data files. This trend continues when the data files (that is, feature maps) progress through the convolution layers. The data file of a target image or a feature map at a convolution layer g is representable as $I^{g,n,c^{in}}(x,y)$, where g stands for the identification number of the convolution layer, n stands for the dimension of the image pattern, and $c^{in}$ is the number of the input channels. The dimension n of a data file represents the number of pixels in a matrix row or in a matrix column of the image pattern.

The example authentication apparatus depicted in FIG. 3A comprises an example plurality of four convolution layers between the input layer and the output.

An image pattern for presentation at the input layer 300 has a prescribed plurality of image-defining elements. The image-defining elements are digitally distributed to form a matrix of pixels, wherein each pixel is an example image-defining element. The example image pattern at the input layer 300 has an example plurality of 128×128 pixels arranged into a two-dimensional input matrix having 128 rows and 128 columns. Where an image pattern is a spatial pattern representable as $I^{g,n,c^{in}}(x,y)$, an image pattern presented at the first convolution layer 301 has g=1, n=128, $c^{in}$=1. A dimension of n=128 herein means that there is a plurality of 128 pixels in a first spatial direction x and a plurality of 128 pixels in a second spatial direction x which is orthogonal to the first direction x. A square matrix is used herein for convenience by a non-square matrix can be used without loss of generality. The example image is a gray-scaled image and the example input layer has a single input channel ($c^{in}$=1). Where the image is colored, the input layer would have three input channels, corresponding to an R (red) input channel for red pixels, a G (green) input channel for green pixels, and a B (blue) input channel for green pixels.

The first convolutional layer 301 (also referred to the first hidden layer) comprises a set of convolution filters. The example first convolutional layer 301 consists of an example plurality of k=32 convolution filters. The convolution filters are to operate with the input image $I^{1,128,1}(x,y)$ to generate and output a plurality of k=32 feature maps. Each feature map is a product of convolutional operations (that is, correlation operations) between the convolution filters and the input data matrix. An output feature map has a reduced number of feature data compared to the input data matrix. In this example, the feature map of the first convolution layer has 64×64 feature data, which is ¼ of the data of the input data matrix. A feature map at the output of the first convolutional layer is represented as $I^{2,64,32}(x, y, ch)$. Each feature map is an output data file of the first convolutional layer which is for input to the next, second, convolutional layer. The output feature map of the first convolutional layer has an example plurality of 64 pixels in the first spatial direction X and an example plurality of 64 pixels in the second spatial direction Y which is orthogonal to the first direction X.

Convolution operation at the $g^{th}$ convolutional layer may be performed using the below example convolution equation $Con^{f,s,p,c,g}(I^{g,n,c^{in}})$:

$Con^{f,s,p,c,g}(I^{g,n,c^{in}}) = pool^p(\emptyset(conv^{f,s,c,g}(I^{g,n,c^{in}})))$, where f is filter size, which is usually an odd number, s is a stride size, p is a pooling factor, c represents the number of channels of the output, and $c^{in}$ is the number of output channels. The pooling factor represents a linear or array scale of reduction between the input data file and the output data file, that is, $pool^p$ reduces the spatial dimension by a factor of p. For example, where p=2, the number of pixels in an array (row or column of the data matrix) reduces from 128×128 image to 64×64. If s>1, additional reduction in spatial dimension may be introduced. ø is an activation function which is to add element-wise non-linearity. The Exponential Linear Unit (ELU) function is an example activation function suitable for the present disclosure.

An example convolution operation equation $conv^{f,s,c}$ is defined below:

$$conv^{f,s,c,g}(I^{g,n,c^{in}})(x, y, l) = \sum_{k'=0}^{c^{in}-1} \sum_{i'=-\lfloor \frac{f}{2} \rfloor}^{\lfloor \frac{f}{2} \rfloor} \sum_{j'=-\lfloor \frac{f}{2} \rfloor}^{\lfloor \frac{f}{2} \rfloor} I^{g,n,c^{in}}(sx+i', sy+j', k') \times W^{f,c^{in},c,g}_{j'+\lfloor \frac{f}{2} \rfloor, i'+\lfloor \frac{f}{2} \rfloor, k', l}$$

$l \in [0, c-1]$, where f is odd number, W is an $f \times f \times c^{in} \times c$ matrix consisting of a plurality of learnable parameters, $w_{j,i,k,l}^{f,c^{in},c,g}$ is one of the weight parameters in $w_{m,g}$, which is a set of weight parameters. In addition, padding may be made to $I^{g,n,c^{in}}$ when calculating conv ($I^{g,n,c^{in}}$) where necessary.

Therefore, the convolutional operation of the first convolutional layer can be represented by the expression: $Con^{f,s,p,c,g}(I^{g,n,c^{in}})$ where f is a filter size, s is a stride size, p is a pooling factor, c represents the number of channels of the output, and $I^{g,n,c^{in}}$ is the feature map of input channel number $c^{in}$ that is input to the $g^{th}$ convolution layer, and n is the width (or height) of the feature map matrix. With the 32 feature maps each having 64×64 feature data, there are a total of 64×64×32 neurons in the first convolutional layer. An example convolutional operation of the first convolutional layer is $Con^{3,1,2,32,1}(I^{1,128,1})$ (i.e. $Con^{3,1,2,32,1}(I^{1,128,1})$ (x,y,ch)) so that f=3 is the filter size, s=1 is the stride size, p=2 is the pooling factor, c=32, $c^{in}$=1 and ch can be a natural number between 1-32. A filter size of 3 herein means the filter has a total of 9 weights arranged into 3 rows in the X-direction and 3 columns in the Y-direction. Each of the weights is a weighting factor, also referred to as a weighting neuron. The value of each weight factor or weight neuron is established through machine learning, for example, through deep learning. With a pooling factor of 2, the number of feature data in a channel of this layer is half the number of feature data the previous layer. In other words, each of the spatial dimensions (n) of the feature matrix is reduced by 50% and the spatial dimensions (n×n) of the feature matrix are reduced by 75% on progressing from the input layer to the first convolutional layer. On the other hand, the number of channels is increased by 32 times on progressing from the input layer to the first convolutional layer.

Example convolution operations at the first convolution layer $Con^{3,1,2,32,1}(I^{1,128,1})$ may be expressed as below:

$Con^{3,1,2,32,1}(I^{1,128,1}) = pool^2(\emptyset(conv^{3,1,32,1}(I^{1,128,1})))$, where, ø is an element-wise ELU function defined below:

$$\emptyset(X) = \begin{cases} X, & X > 0 \\ \exp(X) - 1, & X \leq 0 \end{cases}.$$

X is the output of the conv operation (X=$conv^{3,1,32,1}(I^{1,128,1})$) wherein $pool^P(Y) = maxpool^{P,t}(Y)$, Y=ø(X), and wherein p is the stride size and t is the filter size for pooling similar to the convolution step, in the example case, p=t=2, and $$maxpool^{2,2}(Y) =$$
$$maxpool^{2,2}(Y)(x, y, ch) = \max_{(x',y') \in [2x, 2x+2] \otimes [2y, 2y+2]} (Y)(x', y', ch))$$

for $\forall ch \in [0, 32)$, where $\otimes$ means computation of the Cartesian product.

The second convolutional layer (also referred to the second hidden layer) consists of an example plurality of 64 feature maps each having 32×32 feature data and a set of filters comprising 64 filters. The feature maps of the second convolutional layer are represented as $I^{3,32,64}(x,y, ch)$, where ch can be a number between 1 and 64, and are obtained by convolutional operations (that is, correlation operations) of the 64 filters on the 32 input feature map matrixes of the first convolutional layer, each having 64×64 feature data. The feature data of a channel of the second convolutional layer has an example plurality of 32 feature data in the first spatial direction X and an example plurality of 32 feature data in the second spatial direction Y which is orthogonal to the first direction X. An example convolutional operation of the second convolutional layer is represented by the expression: $Con^{3,1,2,64,2}(I^{2,64,32})(x,y,ch)$, using the same symbol conventions. With a pooling factor of 2, the number of feature data in a channel of this layer is half the number of feature data the previous layer. In other words, each of the spatial dimensions (n) of the feature matrix is reduced by 50% and the spatial dimensions (n×n) of the feature matrix are reduced by 75% on progressing from the input layer to the first convolutional layer. On the other hand, the number of channels increased by 2 times on progressing from the first convolutional layer to the second convolutional layer.

The third convolutional layer (also referred to the third hidden layer) consists of an example plurality of 128 feature maps each being a feature map matrix having 16×16 feature data and a set of filters comprising 256 filters, each being a 3×3 filter matrix. The feature maps of the third convolutional layer are represented as $I^{4,16,128}(x, y, ch)$, where ch can be a number between 1 and 128, and are obtained by convolutional operations (that is, correlation operations) of the 128 filters of the second convolutional layer on the 64 input feature map matrixes of the last convolutional layer, each having 32×32 feature data.

The fourth convolutional layer (also referred to the fourth hidden layer) consists of an example plurality of 256 feature maps each being a feature map matrix having 8×8 feature data and a set of filters comprising 512 filters, each being a 3×3 filter matrix. The feature maps of the third convolutional layer are represented as $I^{5,8,256}(x, y, ch)$, where ch can be a number between 1 and 256, and are obtained by convolutional operations (that is, correlation operations) of the 256 filters of the last convolutional layer on the 128 input feature map matrixes of the last convolutional layer, each having 16×16 feature data.

The output convolutional layer consists of an example plurality of 512 feature maps each being a feature map matrix having 4×4 feature data. The feature maps of the output convolutional layer are represented as $I^{6,4,512}(x, y, ch)$, where ch can be a number between 1 and 512, and are obtained by convolutional operations (that is, correlation operations) of the 512 filters of the last convolutional layer on the 256 input feature map matrixes of the last convolutional layer, each having 8×8 feature data.

An example learned filter for $con^{3,1,2,32,1}(I^{1,128,1})$ for the first output channel is is depicted in the Table A below.

TABLE A

| | | |
|---|---|---|
| 0.082 | −0.011 | 0.072 |
| 0.069 | 0.081 | 0.019 |
| −0.033 | −0.08 | 0.136 |

TABLE B

| | | | |
|---|---|---|---|
| 0.043 | 0.957 | 0.788 | 0.695 |
| −0.118 | 1.182 | 1.501 | 2.318 |
| 1.381 | 0.838 | 1.371 | 0.607 |
| 0.422 | 1.816 | 0.422 | 1.185 |

An example feature map $I^{6,4,512}(x, y, ch)$ at the output layer for input to the FCN is depicted in the Table B above.

The trend of reducing spatial dimensions while increasing the number of channels continues until reaching the output layer of the CNN, when the example output layer has dimensions of 4×4×512, meaning that there are 512 channels and each channel has spatial dimensions of 4×4 feature data.

On progressing from a layer (an earlier layer) to a next layer (a later layer), a pooled convolution operation $Con^{f,s,p,nc,g}(I^{g,n,c^{in}})(x, y, ch)$ is performed on the earlier layer and the result is passed on to the next layer. Pooling from an earlier layer to a next layer may be by maximum pooling (Max Pooling), average pooling or other pooling schemes as preferred.

During the forward pass on progressing from an earlier layer to a next layer, each filter is convolved across the spatial dimensions of the input volume, computing a dot product between the entries of the filter and the input and producing a 2-dimensional activation map of that filter. The entries of the filter collectively define a weight matrix and the weight matrix was learned by the CNN during deep learning training of the CNN.

Example Information Bearing Device 60

An example information bearing device 60 suitable for working with the authentication tool for determination of authenticity is depicted in FIG. 4A. The example information bearing device 60 comprises an alignment device and an image pattern. The alignment device comprises a plurality of alignment components and each alignment component is in the form of a set of nested squares having contrasting colors. There is an example plurality of four alignment components and the alignment components are distributed at far corners of a square defining an outer boundary of the information bearing device 60. The information bearing device 60 comprises an image pattern which is a data bearing pattern embedded or encoded with frequency domain data. The data which are embedded in the image pattern are frequency domain data as shown in FIG. 4B. The frequency domain data comprises a first subset and a second sub-set. The first subset comprises a plurality of frequency data points each having a first spatial frequency and the second subset comprises a plurality of frequency data points each having a second spatial frequency which is higher than the first spatial frequency. Each frequency data point has a characteristic angle with respect to the origin of the u-v axes and a characteristic magnitude. Each data point is characterized by a two-dimensional Cartesian coordinate (u,v) or identifiable by a pair of polar coordinates (r, θ). Data points in a data subset has the same radius (r) value and different angle values (θ).

The frequency domain data points are related to the spatial properties of the image pattern by the relationships:

$$f(x, y) = \text{Re}\left[\sum_{u'=0}^{N-1}\sum_{v'=0}^{M-1} \hat{F}(u', v')\exp\left(\frac{j2\pi u'x}{N}\right)\exp\left(\frac{j2\pi v'y}{M}\right)\right] \quad \text{(Eqn. 0)}$$

$$\hat{F}(\hat{u},\hat{v}) = \sum_{y'=0}^{N-1}\sum_{x'=0}^{M-1} f(x', y')\exp\left(-\frac{j2\pi \hat{u}x'}{N}\right)\exp\left(-\frac{j2\pi \hat{v}y'}{M}\right) \quad \text{(Eqn. 1)}$$

In the above equations, $j=\sqrt{-1}$, and magnitude of a frequency data point is given by the expression:

$$\|F(u, v)\| = \sqrt{(\text{Re}(F(u, v)))^2 + (\text{Im}(F(u, v)))^2} \quad \text{(Eqn. 2)}$$

Where $F\left(\hat{u} - M * H\left(\hat{u} - \frac{M}{2}\right), N * H\left(\hat{v} - \frac{N}{2}\right) - \hat{v}\right) = \hat{F}(\hat{u}, \hat{v})$ is to perform DFT (Discrete Fourier Transform) shift, and H is a unit step function, and an example value of M and N is 512 pixels. The frequency domain data points are scattered in the frequency domain plane to form a more sophisticated or complicated data bearing pattern in the spatial domain plane.

The frequency domain data points may be angularly and frequency dispersed or scattered. For example, a plurality of frequency domain data points may be distributed at a plurality of different frequencies and at a plurality of angles with respect to the origin of the frequency domain plane, which is also referred to as the u-v axes plane or the u-v plane in short. Intuitively, a frequency domain data point at an angle to the origin of the u-v plane corresponds to distribution of featured spatial components in a specific orientation in the spatial plane, which is also referred to as the x-y plane herein.

The frequency domain data points of the information bearing device 60 comprises an example plurality of 8 frequency domain data points of a first spatial frequency of 100 LPI and an example plurality of 8 frequency domain data points of a second spatial frequency of 200 LPI in the real frequency plane. There example frequency domain data points are distributed at uniform angular spacings such that adjacent frequency domain data points of the same spatial frequency have an angular spacing of 22.5°. The example frequency domain data points of the first and second spatial frequencies are radially aligned as an option in this example. In frequency domain terms, the image pattern of the information bearing device 60 of 1 line-per-domain size. The example information bearing device 60 is set to have an physical size of a one-cm square, with original frequency domain size of 512 pixels in each orthogonal direction, and will be printed by a 1200 DPI printer. In this case, the domain size is 512 pixels and the image pattern of the information bearing device 60 of 1/512 line-per-pixel.

To print the information bearing device using a 1200 DPI printer on a 1 cm×1 cm medium, the information bearing device 60 need to be resized and quantized. Specifically, the information bearing device is needed to resize to a width and height of 472 pixels in each orthogonal direction, since 472 pixels per cm is equivalent to 1200 DPI. Each pixel of the data-embedded image pattern is a real number and the resized information bearing device is quantized from real number to bi-level.

Signal Strength

Signal strength is defined by the distance between the magnitude of the data point and the average of the magnitude of the background points surrounding the data point.

Difference between signal strength and magnitude is that the signal strength is standardized by the magnitude of the background points, therefore it is independent of the range of the brightness levels of the restored image of the information bearing device 60, while magnitude is dependent on the range of the brightness levels.

A general equation for determining signal strength of a data point having coordinates (u,v) is:

$$S(u, v) = \frac{\|F(u, v)\| - \text{Mean}(u, v)}{SD(u, v)}, \text{ where}$$

$$\text{Mean}(u, v) = \frac{\sum_{(u',v') \in P^{u,v,r}} \|F(u', v')\|}{|P^{u,v,r}|}, \text{ and}$$

$$SD(u, v) = \sqrt{\frac{\sum_{(u',v') \in P^{u,v,r}} (\|F(u', v')\| - \text{Mean}(u, v))^2}{|P^{u,v,r}|}},$$

wherein $P^{u,v,r}$ is a set of data points defining a square neighborhood centered at (u,v) with radius r excluding (u,v) (square region). i.e. $P^{u,v,r}=[u-r, u+r]\otimes[v-r,v+r]\setminus(u,v)$, Mean (u,v) is the mean of signal strength over set $P^{u,v,r}$ and SD(u,v) is the standard deviation of signal strength over set $P^{u,v,r}$.

In some embodiments, a weighted sum of the magnitude of all selected data points is used as signal strength.

An example equation for signal strength is $$\bar{S}(T) = \frac{1}{|T|} \times \sum_{(u',v') \in T} S(u', v'),$$

wherein T is a set of selected data points For the example information bearing device 60, the signal strength of selected data points, say at 200 LPI, may be expressed as follows:

$$\bar{S}(T) = \frac{1}{8} \times \sum_{(u',v') \in T} \frac{\|F(u', v')\| - \text{Mean}(u', v')}{SD(u', v')} \quad \text{Eqn. 3}$$

In equation 3, T is the set of 8 data points at 200 LPI, and $$\text{Mean} = \frac{\sum_{(u',v') \in P^{u',v',20}} \|F(u', v')\|}{(20 \times 2 + 1)^2 - 1}. \quad \text{(Eqn. 4)}$$

The example information bearing device has a one-cm width, or a width of 1/2.54, inch. When applying Fourier transform with a pixel domain size 512 pixels, r=20 lines. This corresponds to 20 points. Other values of r can be selected according to the distribution of data points in the set T such that the square region of each data point without including adjacent data points. The maximum value without including adjacent data points of r in this example is 25 points $$\left(\left\lfloor \frac{200 \, LPI \times \frac{1}{2.54} \text{ inch}}{3} \right\rfloor - 1\right).$$

Example Authentication Apparatus

In example embodiments, the authentication apparatus is implemented by way of a smart phone executing a set of instructions in the form of an application software. The instructions stored and resident on volatile memories, such as RAM on execution. Referring to FIGS. 1, 5A and 5B, a smart phone 80 comprises a processor 12, a data storage device 14, a display device 16, a communication frontend device 18, an image capture device 20 and a light emitting device 22 which are contained in a main housing 82.

To operate the smart phone as an authentication apparatus, a user is to activate the application software. Upon activation of the application software on the smart phone, a user may capture an image of a target information bearing device 60 by using the image capture device of the smart phone, and the captured image will appear on the display screen of the smart phone, as depicted in FIG. 4A. In some embodiments, the captured image has 512×512 pixels.

The authentication apparatus will next proceed to perform the authentication processes defined by the authentication tool and to evaluate whether the captured image corresponds to that of an authentic information bearing device 60 or a non-authentic information bearing device 60.

To process the captured image, a portion, 128×128 pixels, of the data-bearing portion of the captured image sufficient to facilitate analyses is cropped, for example, by the apparatus, from the captured image. A portion having a size of 128×128 pixels is selected since the input layer of the authentication model is set a size of 128×128 pixels. It will be appreciated that the image size to be examined by the authentication apparatus will be adjusted when the size of the input layer is changed or according to the size of the input layer.

The cropped image ($I^{1,128,1}(x,y)$) is subject to convolutional operations at the first convolutional layer by the convolutional function $Con^{3,1,2,32,1}(I^{1,128,1})(x,y,ch)$ and the set of 32 filters.

Output of the first convolutional layer, that is, $I^{2,64,32}(x, y, ch)$, is fed to the second convolutional layer and subject to convolutional operations at the second convolutional layer by the convolutional function $Con^{3,1,2,64,2}(I^{2,64,32})(x,y,ch)$ and the set of 64 filters.

Output of the second convolutional layer, that is, $I^{3,32,64}(x,y, ch)$, is fed to the third convolutional layer and subject to convolutional operations at the third convolutional layer by the convolutional function $Con^{3,1,2,128,3}(I^{3,32,64})(x, y, ch)$ and the set of 128 filters.

Output of the third convolutional layer, that is, $I^{4,16,128}(x,y,ch)$, is fed to the fourth convolutional layer and subject to convolutional operations at the fourth convolutional layer by the convolutional function $Con^{3,1,2,256,4}(I^{4,16,128})(x,y,ch)$ and the set of 256 filters.

Output of the fourth convolutional layer, that is, $I^{5,8,256}(x, y, ch)$, is fed to the CNN output layer and subject to convolutional operations at the output layer by the convolutional function $Con^{3,1,2,512}$ ($I_8(x, y, ch)$ and the set of 512 filters.

Images formed from selected feature maps at the output of the input layer are depicted in FIGS. 6A1 to 6A3, 6B1 to 6B3 and 6C1 to 6C3.

FIG. 6A1 to 6A3 are images formed from features maps of the 1$^{st}$ convolutional layer (input to the 2nd convolutional layer) at representative channels 24 ($I^{2,64,32}(x,y,24)$), 27 ($I^{2,64,32}(x,y,27)$) and 28 ($I^{2,64,32}(x,y,28)$), respectively, before max pooling. It is noted that each of the feature maps contains brightness information, indicating that the neurons in this layer are more sensitive to the lower dimension parameters such as brightness, contrast and blurriness.

FIG. 6B1 to 6B3 are images formed from features maps of the 2nd convolutional layer at representative channels 12 ($I^{3,32,64}(x,y,12)$), 39 ($I^{3,32,64}(x, y,39)$) and 44 ($I^{3,32,64}(x,y,44)$), respectively. It is noted that each of the feature maps contains orientation or directional information, indicating that the neurons in this layer are more sensitive to directional properties of the image pattern.

FIG. 6C1 to 6C3 reveal that higher dimensional features are extracted at later CNN layers.

To determine whether a purported authentication device is authentic or non-authentic, an authentication apparatus will execute stored instructions to examine authenticity of the purported authentication device with reference to a stored image. The stored image is an image purporting to be an image of the purported authentication device, and the stored image is also referred to as a target image herein. The target image is an image for examination of authenticity, and may be an image of a purported authentication device captured by a user operator using the authentication apparatus or an image of a purported authentication device captured by a user operator using another apparatus and transferred to the authentication apparatus for examination of authenticity.

The authentication apparatus utilizes and processes the stored target image to examine authenticity of the purported authentication device with reference to the target image, for example, details of the target image, and with reference to a set of predetermined authentication criteria.

In order to make a decision on authenticity, the authentication apparatus would need to determine or decide whether the target image is an image of an authentic authentication device or not. An image of an authentic authentication device is a primary copy of an authentic information bearing device, while an image of a non-authentic authentication device may be a secondary copy of an authentic information bearing device or a copy of a fake information bearing device. A primary copy herein means a directly captured image of an authentic information bearing device while a secondary copy herein means an indirect copy of an authentic information bearing device, for example, a copy of a primary copy. In order to determine whether a target image is an image of an authentic information bearing device, the authentication apparatus will process the target image with reference to a set of predetermined authentication criteria. The authentication criteria may include information, data and/or physical details which are inherent or present in the authentic information bearing device.

It is observed that when an image of an authentic information bearing device for facilitating authentication is captured, many physical details which are characteristic of the authentic information bearing device and are inherent or present in the authentic information bearing device are lost. Loss of details herein includes both total loss, substantial loss, partial loss and/or degradation of details. As a result, the details are no longer present in the captured image, or, if present, are noticeably degraded or distorted.

On the other hand, many physical details which are inherent or present in the authentic information bearing device are not present in a secondary image of the authentic information bearing device or a fake authentic information bearing device, and/or are lost when an image of the secondary image or an image of the fake authentic information bearing device is captured.

The loss of details in primary image makes authentication based on a captured image a major challenge, especially when there are overlapping loss of details.

Modern authentic information bearing devices contain data-embedded image patterns which are digitally formed and consist of pixels. Each pixel has characteristic physical properties including size, shape, color, brightness, etc., and the entirety of pixels collectively define a data-embedded image pattern. Each data-embedded image pattern has characteristic physical properties including brightness, contrast, blurriness, sub-pattern shapes, sub-pattern frequencies, sub-pattern orientations, sub-patterns signal intensities, etc. Some of the characteristic physical properties suffer degradation or loss of fidelity during image capture and/or reproduction.
Brightness (Br)

For example, where an authentic information bearing device comprises a data-embedded image pattern which consists of gray-scale coded pixels, each pixel has a gray level having a value between 0 and K−1, where K is typically a natural number in the form of $2^n$, and n is a natural number.

When the data-embedded image pattern of the authentic information bearing device is captured by an image capture apparatus, the gray levels of the pixels forming the captured image may be changed. For example, the gray levels may be shifted linearly, non-linearly, randomly or may have an entirely different gray-scale distribution of pixels compared to those of the data-embedded image pattern. The change may be due to internal setting of the image capture apparatus (for example, exposure setting), calibration of the image capture apparatus, ambient illumination, sensitivity and/or linearity of the image sensor of the capture apparatus, angle of image capture, and/or other parameters.

In the example information bearing device 60 of FIG. 4A, each of the pixels is coded on one of K=256=$2^8$ levels and the pixel distributions are designed such that the data-embedded image pattern has an average brightness level $$Br = \Sigma_{(x',y') \in G} \frac{I(x', y')}{|G|}$$

of 152, where G is the set of gray level of pixel (x,y) excluding pixels corresponding to alignment devices and I(x,y) is a restored image of the captured information bearing device.

When a smart phone having a built-in image capture device is used to capture an image of the information bearing device 60, the resulting captured images have different average brightness levels ranging from 19 to 252, as depicted respectively in FIGS. 7A1 to 7A5, compared to the designed brightness value of 152 of the information bearing device 60 of FIG. 4A. Example average brightness values and the corresponding signal strength values S of a selected frequency (200 LPI) are set out in Table 1 below.

TABLE 1

|  | FIG. 4C | FIG. 7A1 | FIG. 7A2 | FIG. 7A3 | FIG. 7A4 | FIG. 7A5 |
|---|---|---|---|---|---|---|
| Br | 152 | 19 | 45 | 147 | 192 | 252 |
| S 100LPI | 45.17 | 29.7 | 37.68 | 38.85 | 39.91 | 27.95 |
| S 200LPI | 74.30 | 4.8 | 17.68 | 33.65 | 40.29 | 14.04 |

A graph of the above signal strength verse brightness (lightness) is illustrated in FIG. 14B.

Among the captured images, the captured image (FIG. 7A1) having the lowest brightness is captured with no supplementary illumination of the smart phone on and is under-exposed in photography terms. The captured image (FIG. 7A5) having the highest brightness level 252 is captured with excessive illumination and/or exposure time.

It will be appreciated that differences in brightness will also result when the information bearing device 60 is printed in different sizes and therefore have different printing densities, as illustrated in FIG. 10A1 to 10A3.

While average brightness is used as a reference brightness parameter herein, it should be appreciated that the brightness parameter can be a measure of brightness distribution in a specific orientation or in specific orientations, brightness in a selected portion of the image pattern, etc. without loss of generality.

Where pixels are coded in colors, each pixel may have three color components, and each has one of a plurality of color levels.

Contrast

When the data-embedded image pattern of the authentic information bearing device is captured by an image capture apparatus, the contrast of the pixels forming the captured image may be changed. For example, the contrast can vary due to background texture of the medium on which the information bearing device is formed, or due to background illumination and/or exposure setting of the image capture apparatus when the image is being captured.

Example images of the information bearing device 60 of FIG. 4A captured on medium of different textures are depicted in FIGS. 11A1 to 11A3 and at different illumination levels and/or different exposure time are depicted in FIGS. 9A1 to 9A5. The contrast values of the different captured images and the corresponding signal strength values of the data points at 200 LPI are set out in Table 2 below.

TABLE 2

|  | FIG. 4C | FIG. 9A1 | FIG. 9A2 | FIG. 9A3 | FIG. 9A4 | FIG. 9A5 |
|---|---|---|---|---|---|---|
| C | 124 | 8 | 20 | 26 | 31 | 37 |
| S 100LPI | 45.17 | 35.67 | 33.96 | 39.03 | 39.78 | 40.7 |
| S 200LPI | 74.30 | 14.51 | 18.57 | 23.64 | 38.47 | 39.88 |

A graph of the above signal strength verse contrast is illustrated in FIG. 14A.

The value of contrast C is obtained using the standard deviation relationship below:

$$C = \sqrt{\frac{\Sigma_{(x',y') \in G}(I(x', y') - Br)^2}{|G|}}$$

Wherein G is the set of pixels in the restored image excluding alignment devices Blurriness When the data-embedded image pattern of the authentic information bearing device is captured by an image capture apparatus, the images captured are almost inevitably blurred to some extent and the degree of blurriness is dependent on many factors, for example, due to auto-focusing setting or limitation of the image capture apparatus, hand tremor or poor focusing of a user operator.

Example images of the information bearing device 60 of FIG. 4A having different degrees of blurriness are depicted in FIGS. 8A1 to 8A5. The degrees of blurriness of the different images and the corresponding signal strength values of the data points at 200 LPI are set out in Table 3 below.

TABLE 3

|  | FIG. 4C | FIG. 8A1 | FIG. 8A2 | FIG. 8A3 | FIG. 8A4 | FIG. 8A5 |
|---|---|---|---|---|---|---|
| Bl | 1.45 | 3.91 | 5.31 | 6.27 | 9.93 | 11.04 |
| S 100LPI | 45.17 | 42.11 | 38.82 | 40.91 | 36.75 | 31.14 |
| S 200LPI | 74.30 | 47.98 | 36.80 | 19.25 | 17.62 | 17.29 |

A graph of the above signal strength verse blurriness is illustrated in FIG. 14C.

Blurriness may be determined using different methodologies. For example, blurriness herein may be determined using methods such as using edge map from edge detection methods.

In example, the blurriness may be determined by applying the following steps on the restored image:

Performing de-noising using convolution with a Gaussian filter

Calculate gradient (edge map) using convolution with Sobel filter from the de-noised image Use a scaled version of a representative (e.g. median or 75-percentile) of the reciprocal of the gradient without pixels corresponding to the alignment device as the measure of blurriness A set of equation to performing de-noising using convolution with a Gaussian filter on the restored image I(x,y) with M columns and N rows, may be:

$$\hat{I}(x, y) = \begin{cases} I(x, y), (x, y) \in [0, M - 1] \otimes [0, N - 1] \\ 0, \text{ else} \end{cases}$$

$$Ga^{k,\sigma}(I)(x, y) = \sum_{i'=0}^{2k} \sum_{j'=0}^{2k} \hat{I}(x + i', y + j') \times \frac{\exp\left(-\frac{(i' - k)^2}{2\sigma^2}\right)\exp\left(\frac{(j' - k)^2}{2\sigma^2}\right)}{\sum_{k'=0}^{2k} \sum_{l'=0}^{2k} \exp\left(\frac{(k' - k)^2}{2\sigma^2}\right)\exp\left(\frac{(l' - k)^2}{2\sigma^2}\right)}$$

An equation to calculate gradient (edge map) using convolution with Sobel filter from the de-noised image, may be:

$$S(Ga^{1,0.8}(I))(x, y) = \sqrt{\left[\left(Ga^{1,0.8}(I) * \begin{bmatrix} 1 & 0 & -1 \\ 2 & 0 & -2 \\ 1 & 0 & -1 \end{bmatrix}\right)(x, y)\right]^2 + \left[\left(Ga^{1,0.8}(I) * \begin{bmatrix} 1 & 2 & 1 \\ 0 & 0 & 0 \\ -1 & -2 & -1 \end{bmatrix}\right)(x, y)\right]^2}$$

An example equation for calculating blurriness, Bl, of, using 50-th percentile (median) as the representative, may be:

$$Bl = \frac{K}{Q^{50}_{(x',y')\in G} (S(Ga^{1,0.8}(I))(x', y'))}$$

wherein $$Q^{p}_{(x',y')\in G} (S(Ga^{1,0.8}(I))(x', y'))$$

is the value of $S(Ga^{1,0.8}(I))$ $(x_-, y_-)$ that is closest to p-th percentile for $(x_-, y_-) \in G$ K is a positive number.

G is the set of pixels outside the alignment device.

Non-Authentic Information Bearing Devices

It is observed that the physical features of a captured image of an authentic information bearing device can be somewhat different to those of the authentic information bearing device. It is also observed that the physical features of a captured image of a non-authentic information bearing device are somewhat different to those of the authentic information bearing device. Physical features include physical properties and characteristics such as brightness, contrast, and blurriness.

An authentication apparatus would need to be capable to differentiate between whether an image is that of an authentic information bearing device or that of a non-authentic information bearing device to determine authenticity and provide useful output.

It is observed that some of the changes or differences in physical features due to image capture processes result in a change in the physical properties of the data embedded in the data-embedded image pattern.

It has also been observed that there are differences between the degrees or extents of changes present in an image of an authentic information bearing device and in an image of a non-authentic information bearing device, both with respect to the authentic information bearing device.

It has also been observed that details of certain characteristic features of the information bearing device are more adversely affected in the case of a non-authentic information bearing device compared to that of an authentic information bearing device.

The characteristic features may relate or correspond, for example, to some characteristic data embedded in the data-embedded image pattern.

For example, the characteristic signal strength of a captured image of an authentic data-embedded image pattern is found to be higher than the characteristic signal strength of a captured image of a non-authentic data-embedded image pattern, given the same image capture conditions.

It is also observed that higher spatial frequency contents of the data-embedded image pattern are more prone to degradation than lower spatial frequency contents, although the degradation is usually non-human perceivable.

In order to facilitate fast, efficient and effective determination of authenticity of a presented image which purports to be a primary image of an authentic information bearing device, deep learning (also known as deep structured learning or hierarchical learning) is utilized to facilitate building of authentication tools for subsequent determination of authenticity.

In an example, CNN is trained to learn to distinguish between an image of an authentic data-embedded image pattern and an image of a non-authentic data-embedded image pattern so that the trained CNN can provide classification information on the likelihood of whether an input image is an image of an authentic data-embedded image pattern or an image of a non-authentic data-embedded image pattern.

CNN Structure

An example CNN which can be trained to learn and develop an authentication tool has a structure comprising an input layer, an output layer and a plurality of convolutional layers, as depicted in FIGS. 2A and 3. The structure of the CNN described herein-above is incorporated herein by reference for succinctness.

On defining the CNN structure, the input layer is set to have a single channel since the example information bearing device 60 has a data-embedded image pattern which is defined by pattern defining elements in gray-scale coding. In embodiment where the information bearing device 60 is color coded, the input layer may have three channels, corresponding to R (Red), G (Green), B (Blue), without loss of generality.

It has been observed that while the information bearing device consists of 512×512 pixels, a portion of the data-embedded image pattern is sufficient to facilitate learning and determination of authenticity. Trials and experiments show that a portion consisting of 128×128 pixels appears to be a minimum to facilitate meaningful learning and processing by a CNN. Therefore, the input layer is set to have a pixel size of 128×128 pixels. It will be noted that the input layer contains a portion of the raw image to be processed.

As the convolutional layers move further from the input layer, the number of features to be learned and the complexity of features increases. As a result, the number of channels increases and the number of feature data per channel decreases as the distance of a convolutional layer away from the input layer increases, or the as the distance of a convolutional layer away from the output layer decreases.

The output layer has an output dimension of 4×4×512 such that there are 512 feature maps each having 4×4 feature data for input to the FCN. The FCN processes the 8192

(4×4×512) elements and generates an output, that indicate, the probability that the information bearing device is real.

In order to train a CNN, images of authentic and non-authentic data-embedded image patterns having varying degrees of imperfections are used. The imperfections include brightness, contrast and blurriness different to that of the data-embedded image pattern of an authentic authentication device. The data-embedded image pattern itself is also used optionally.

In order to build an authentication tool of practical utilities, only images having imperfection values which are within acceptable ranges are used. An image having imperfection values which are within acceptable ranges means the characteristic features of the image which can be used to differentiate between an image of an authentic authentication device and a non-authentic authentication device can be machine recognizable.

The training images are selected according to some selection criteria such that the imperfection values are within the acceptable ranges.

Using the information bearing device 60 as an example, the selected training images have an acceptable range of blurriness of between 3 and 10, while the authentic data-embedded image pattern has a reference blurriness of around 1 or 2. The selected training images have an acceptable range of brightness of between 45 and 215, while the authentic data-embedded image pattern has a reference brightness of around 152. The selected training images have an acceptable range of contrast of at least 20, while the authentic data-embedded image pattern has a reference contrast of around 124.

As the highest frequency data of the information bearing device 60 are at 200 LPI, the signal strength of those data is used as a bench mark of feasibility. In the example, a signal strength of 17.5 or above is used as a selection threshold.

The selection threshold is set above the maximum signal strength of images of a secondary copy with blurriness close to the lower end. In the example in Figure, the maximum signal strength of the clearest image of the secondary copy is around 17.45; therefore the threshold is set just above 17.45 and the threshold is 17.5. This secondary copy is made using a copier with a printing resolution of 1200 DPI, in this example.

A large number of about 6000 training images having a wide variety of combination of imperfections is used to train a CNN. The training images include images of authentic and non-authentic information bearing devices.

Training Process

FIG. 13 is a flow chart depicting a training process for a neural network using a process known as back propagation. The process of back propagation comprises the step 1300 to step 1308. At step 1300 the weight parameters, $w_{ij}$, are initialized, wherein $w_{ij}$ is the ith weight in the jth neural network layer of a neural network. The weight parameters may be initialized according to a uniform distribution or a Gaussian distribution and 0 for all biases, for example. At step 1301, each image of a subset from the 6000 training image, which is labeled as 1 if it is a primary copy (i.e. $Y_{labeled}=1$) and 0 if it is a secondary copy (i.e. $Y_{labeled}=0$), is passed into the initialized neural network to obtain a predicted output, $Y_{predicted}$, which is a function of $w_{m,g}$, i.e. $Y_{predicted}=f(w_{m,g})$ wherein the g-th layer is the output layer of the FCN that produces $Y_{predicted}$. At step 1302, a loss function, L, is calculated in terms of $Y_{labeled}$ and $Y_{predicted}$ from each of the image of the subset. At step 1303, a partial derivative for each of the weight parameters, $w_{m,g}$, i.e.

$$\frac{\partial L}{\partial w_{m,g}},$$

is computed. At step 1304, each of the weight parameters, $w_{iN}$, is adjusted, i.e. replaced by $$w_{iN} - \text{learning\_rate} \times \frac{\partial L}{\partial w_{m,g}}.$$

At step 1305, each of the weight parameters of each of the layers of the neural network is adjusted in a similar manner according to step 1303 and step 1304. At step 1306, the steps 1302-1305 are repeated for another subset of images that are substantially different to the subsets trained previously. At step 1307, when all of the 6000 training images are passed through the neural network at least once, the neural network is determined for convergence. If the convergence condition is satisfied, the training process ends at step 1308. Otherwise steps 1302 to 1307 are repeated again until the neural network converges.

Initially, a plurality of images of the authentic authentication devices is fed into the CNN for learning.

After learning had complete, a plurality of sets of filters having learned weights is formed. The filters, other with the structure, collectively define an authentication tool. The authentication tool may be incorporated into an application software for download by a computer, such as a smart phone, for subsequent authentication use.

The data-coded image pattern ("image pattern") of example authentication devices herein is typically devised using or defined by a plurality of pixels, say N×M pixels, and the image pattern is usually arranged as a 2-dimensional pixel matrix. Therefore, an ideal primary copy ("expected primary copy") of a genuine authentication purposes would be expected to be an image pattern having the same number of pixels, that is, N×M pixels. An authentication apparatus having an image capture device which when duly aligned with the target will produce an image having the same pixel number (and pixel disposition) is referred to as a reference authentication apparatus or a reference apparatus in short and the corresponding image capture device is referred to as a reference image capture device.

Where a primary image of a genuine authentication device ("target") is taken by an image capture device which is not a reference image capture device, the primary image captured by the non-reference image capture device will have a different number of pixels, say N'×M' pixels, compared to an expected primary copy, where N'> or <N or M'> or <M.

While the qualities of primary images captured by non-reference image capture devices are expected to be different to those captured by reference image capture device, the authentication device is no less than a genuine authentication device, and the neural network needs to be trained to recognize such captured images as corresponding to a genuine authentication device, that is a genuine target.

Therefore, differences in image quality due to differences in qualities image capture devices used by users need to be taken into consideration during the training process.

Where a target is originally defined by N×M pixels, but a primary image of the target when captured by an image capture device under due conditions, including due alignment conditions etc., will result in different pixel quantities, such an image capture device is referred to as a variant image capture device or a variant device in short, and the associated authentication apparatus is referred to as a variant authentication apparatus or non-reference authentication apparatus.

To train the neural network, primary image copies of the target which are captured by a variant image capture device are input to the neutral network and the neutral network is trained to recognize such captured images as corresponding to a genuine target.

In example embodiments, an information bearing pattern as part of an authentication device is embedded with a first set of security data $D_1$ and a second set of security data $D_2$, as depicted in FIG. 4B.

For example, the data-coded image pattern of FIG. 4A is designed with N=M=512, with $D_1$ at 100 LPI and $D_2$ at 200 LPI. When a primary image of the data-coded image pattern is captured by a reference apparatus, $D_1$ has an example first reference strength of 45.17 and $D_2$ has a second reference strength of 74.30.

When a primary image of the data-coded image pattern is captured by a variant apparatus having a lower image size of N'=M'=399, the signal strength at $D_1$ drops to 25.25 and the signal strength at $D_2$ drops to 14.56.

When a primary image of the data-coded image pattern is captured by a variant apparatus having a lower image size of N'=M'=450, the signal strength at $D_1$ drops to 39.42 and the signal strength at $D_2$ drops to 41.83.

When a primary image of the data-coded image pattern is captured by a variant apparatus having a lower image size of N'=M'=499, the signal strength at $D_1$ drops to 40.84 and the signal strength at $D_2$ drops to 46.81.

When a primary image of the data-coded image pattern is captured by a variant apparatus having a higher image size of N'=M'=569, the signal strength at $D_1$ drops to 41.67 and the signal strength at $D_2$ drops to 49.71.

When a primary image of the data-coded image pattern is captured by a variant apparatus having a higher image size of N'=M'=652, the signal strength at $D_1$ drops to 43.23 and the signal strength at $D_2$ drops to 52.48.

When a primary image of the data-coded image pattern is captured by a variant apparatus having a higher image size of N'=M'=659, the signal strength at $D_1$ drops to 39.83 and the signal strength at $D_2$ drops to 45.00.

Therefore, a drop of image quality or data quality as reflected by the drops in signal strengths of the security data can be expected when the number of captured pixels deviates from the number of devised pixels.

It is noted that the blurriness of primary images of a genuine target obtained by non-variant device also deteriorates (that is, drops).

As an example, a reference primary image of the genuine target has a blurriness of between 1-2 while the primary images of the genuine target when target by the above example variant apparatus has a blurriness of between 2 or 3 and 10. It is noted that a primary image captured by a hand-held reference authentication apparatus has at best a blurriness of around 2. In relation to blurriness, a higher blurriness value means more blurriness which is undesirable and represents an inferior quality compared a lower blurriness. In other words, a low blurriness in always preferred.

Therefore, in training the neural network using primary images of the genuine target, the range of blurriness of primary images used is between 2 or 3 and 10.

Where a primary image has a blurriness value that is too high, for example, higher than an upper threshold, say 10 in this example, such primary images are not used for neural network training since the data quality has been too much impaired. It is noted that blurriness of higher frequency contents drops more rapidly than lower frequency contents. Therefore, the blurriness of a selected data frequency may be selectively used for training purposes. In example embodiments, the data, say $D_2$=200 DPI having a higher spatial frequency content is used as a criterion for determining whether a primary image is suitable for training the neural network.

In addition to using variant image capture device of different image sizes when duly aligned, additional primary images of different image sizes of the genuine target are also taken by, for example, moving the hand-held image capture device back and forth with respect to the target such that different degrees of out-of-focus due to the auto-focus mechanism can be captured.

The get primary images of different blurriness, a plurality of images of the genuine target are taken by a handheld authentication apparatus. The primary image may be taken under different conditions, for example, by moving the hand-held image capture device back and forth with respect to the target such that different degrees of out-of-focus due to the auto-focus mechanism can be captured, and/or by Introducing small motions, for example, shaking motion to the handheld image capturing device in different directions.

The above example imperfect primary images of the target are fed to the neural network in order to train the neural network that such images correspond to primary images of the target, and the neural network is trained to recognize such images as corresponding to genuine, authentic, or real.

Imperfect images of a non-genuine target, for example images obtained using the above capture approaches (which are incorporated herein by reference and to apply mutatis mutandis) are fed to the neural network in order to train the neural network that such images correspond to non-primary images of the target, and the neural network is trained to recognize such images as corresponding to fake, counterfeit or copied.

Where a captured image has a different number of pixels compared to the designed pixel number, a restoration process is required. The captured image is a data file $\hat{I}(x,y)$ having N'×M' pixels and the restored image is a data file $I(\hat{x},\hat{y})$ having N×M pixels. To transform an image data file having N'×M' into an image data file having N×M pixels, it is noted that pixels in the captured image domain and restored image domain are related by a homography matrix G, such that:

$$\hat{x} = \left[\frac{G_{11}x + G_{12}y + G_{33}}{G_{31}x + G_{32}y + G_{33}}\right] \text{ and } \hat{y} = \left[\frac{G_{21}x + G_{22}y + G_{23}}{G_{31}x + G_{32}y + G_{33}}\right],$$

wherein $(\hat{x},\hat{y})$ are pixel data coordinates of the restored image and (x,y) are pixel data coordinates of the captured image.

To prepare for restoration, four corners for each of the example four alignment device of the example information bearing device are detected using methods such as Harris corner detector, totaling sixteen corners from the captured image. The sixteen corners are represented as $(x_k,y_k)$ for k∈[1,16]. It will be appreciated that the corresponding location of $(x_k,y_k)$ in the restored image is $(\hat{x}_k,\hat{y}_k)$. It is expected that an appropriate homography matrix G would result in minimum back-projection error, and an example homographic matrix is depicted below.

$$\hat{G} = \underset{\tilde{G}}{\operatorname{argmin}} = \left(\sum_{k' \in [1,16]} \left[\left(\hat{x}_{k'} - \frac{G_{11}x_{k'} + G_{12}y_{k'} + G_{13}}{G_{31}x_{k'} + G_{32}y_{k'} + G_{33}}\right)^2 + \left(\hat{y}_{k'} - \frac{G_{21}x_{k'} + G_{22}y_{k'} + G_{23}}{G_{31}x_{k'} + G_{32}y_{k'} + G_{33}}\right)^2\right]\right)$$

In example applications where the restored image size has N×M=512 pixels×512 pixels, for each of $(\hat{x},\hat{k}) \in [0,512] \otimes [0,512]$, the corresponding back projection in the captured image is expressed as $$\left[\frac{(\hat{G}^{-1})_{11}\hat{x} + (\hat{G}^{-1})_{12}\hat{y} + (\hat{G}^{-1})_{13}}{(\hat{G}^{-1})_{31}\hat{x} + (\hat{G}^{-1})_{32}\hat{y} + (\hat{G}^{-1})_{33}}, \frac{(\hat{G}^{-1})_{21}\hat{x} + (\hat{G}^{-1})_{22}\hat{y} + (\hat{G}^{-1})_{23}}{(\hat{G}^{-1})_{31}\hat{x} + (\hat{G}^{-1})_{32}\hat{y} + (\hat{G}^{-1})_{33}}\right]$$

If any of the $$\frac{(\hat{G}^{-1})_{11}\hat{x} + (\hat{G}^{-1})_{12}\hat{y} + (\hat{G}^{-1})_{13}}{(\hat{G}^{-1})_{31}\hat{x} + (\hat{G}^{-1})_{32}\hat{y} + (\hat{G}^{-1})_{33}} \text{ and } \frac{(\hat{G}^{-1})_{21}\hat{x} + (\hat{G}^{-1})_{22}\hat{y} + (\hat{G}^{-1})_{23}}{(\hat{G}^{-1})_{31}\hat{x} + (\hat{G}^{-1})_{32}\hat{y} + (\hat{G}^{-1})_{33}}$$

is not an integer, interpolation method such as bilinear interpolation may be used to obtain the pixel value/brightness level at $(\hat{x},\hat{y})$.

While the disclosure has been described herein with reference to examples, the examples are not intended and should not be used to limit the scope of disclosure.

| Table of numerals | | | |
|---|---|---|---|
| 10 | authentication apparatus | 12 | Processor |
| 14 | data storage device | 16 | display device |
| 18 | communication frontend device | 20 | image capture device |
| 22 | light emitting device | 60 | information bearing device |
| 80 | smart phone | 82 | main housing |
| 30 | convolutional neural network | 50 | fully connected network |
| 300 | input layer | 399 | output layer |
| 301-30n | convolutional layers | | |

The invention claimed is:

1. An authentication apparatus configured for determining whether a captured image is a primary image or a non-primary image of an authentic information bearing device, the authentication apparatus comprising a microprocessor, a display, a data storage device, and an authentication tool which is resident in the data storage device;
wherein the authentic information bearing device comprises a data-embedded image pattern which is encoded with a set of discrete data, wherein each discrete data of the set of discrete data has a characteristic signal strength and correlates with a set of spatially distributed pattern defining elements of the data-embedded image pattern by a domain transformation function, the spatially distributed pattern defining elements being spread in the data-embedded image pattern to form a spread image pattern;
wherein the authentication tool comprises a trained neural network having a neural network structure comprising an input layer, an output layer and a plurality of neural network layers intermediate the input layer and the output layer, and each neural network layer has a set of filters comprising a plurality of learned filters; wherein each learned filter comprises a plurality of filter elements and each filter element has a filter value, and wherein the learned filters and filter values were composed or constituted by computer based-deep-learning using a plurality of training images;
wherein the training images comprises a plurality of primary images of the data-embedded image pattern and a plurality of non-primary images of the data-embedded image pattern of the data-embedded image pattern, and wherein a primary image and a corresponding non-primary image have different characteristic signal strengths; and
wherein the trained neural network was trained to determine whether a captured image is a primary image or a non-primary image with reference to the characteristic signal strengths of the training images.

2. The authentication apparatus of claim 1, wherein the neural network is a convolutional neural network (CNN) comprising at least four convolutional layers, wherein the convolutional layers are sequentially connected and each convolutional layer comprises a number of channels defining a plurality of channels, wherein the number of channels of a convolutional layer increases on progressing from the input layer to the output layer, wherein each channel has a number of feature data defining a plurality of feature data, wherein the number of feature data per channel decreases on progressing from the input layer to the output layer, and wherein the feature data are learned using the plurality of training images and with reference to the characteristic signal strengths of the training images.

3. The authentication apparatus of claim 1, wherein the apparatus is configured to determine authenticity or genuineness with reference to whether a captured image is a primary image or a non-primary image.

4. The authentication apparatus of claim 1, wherein the training images comprises imperfect images having varying degrees of image imperfections, and the image imperfections are introduced into the imperfect images in the course of image capture processes or due to different image capture conditions.

5. The authentication apparatus of claim 1, wherein the data-embedded image pattern is configured such that the characteristic signal strength of a primary image is above a signal strength threshold and the characteristic signal strength of a non-primary image is below the signal strength threshold.

6. The authentication apparatus of claim 5, wherein the signal strength threshold is a threshold of trainability of the CNN.

7. The authentication apparatus of claim 1, wherein the data-embedded image pattern is configured such that the characteristic signal strength of the primary image is higher than the characteristic signal strength of a non-primary image, and wherein the neural network is configured to learn with reference to the signal strengths of the primary and non-primary images.

8. The authentication apparatus of claim 1, wherein the set of discrete data comprises a first discrete data and a second discrete data, wherein the first discrete data has a first characteristic spatial frequency which is a higher characteristic spatial frequency and the second discrete data has a second characteristic spatial frequency which is a lower characteristic spatial frequency, wherein a primary image has a first signal strength and a non-primary image has a second signal strength which is a degradation compared to the first signal strength, and wherein the degradation in respect of the first discrete data is more than the degradation in respect of the second discrete data; and wherein the neural network is configured to learn with reference to the degradation in signal strengths of the primary and non-primary images.

9. The authentication apparatus of claim 8, wherein the first characteristic spatial frequency is at or above 100 LPI; and/or wherein the second characteristic spatial frequency is at or below 200 LPI.

10. The authentication apparatus of claim 1, wherein the authentication tool is storable as a set of computer executable instructions.

11. The authentication apparatus of claim 1, wherein the training images comprises imperfect images having varying degrees of image imperfections, wherein the image imperfections are controlled imperfections introduced in the course of image capture processes or due to different image capture conditions.

12. The authentication apparatus of claim 11, wherein the image imperfections comprise imperfections in brightness, contrast, blurriness, image pixel number or dimension, and/or background noise.

13. The authentication apparatus of claim 1, wherein the data-embedded image pattern is encoded with a set of discrete frequency data, and each discrete frequency data has a frequency magnitude; and wherein each discrete frequency data correlates with a set of spatially distributed pattern defining elements of the data-embedded image pattern by Fourier Transform.

14. A method of devising an authentication tool which is to reside on a mobile apparatus as a set of computer executable instructions in the form of a trained neural network, wherein the mobile apparatus is to operate as an authentication apparatus to determine whether a captured image is a primary image or a non-primary image of a data-coded image pattern of an authentic information bearing device upon execution of the instructions of the authentication tool, and wherein the trained neural network comprises a number of channels and each channel has a plurality of feature data; wherein the method comprises:
  feeding a computer-based neural network with a plurality of training files, wherein each training file is a data file of a training image comprising a plurality of image-defining elements, wherein the training images comprises a plurality of primary images of the data-coded image pattern and a plurality of non-primary images of the data-coded image pattern, and wherein the data-coded image pattern comprises a set of spatially distributed pattern defining elements which correlates to a coded data by a domain transformation function and has a characteristic signal strength relating to magnitude of the coded data; and
  training the neural network to differentiate between a primary image and a non-primary image with reference to the characteristic signal strengths of the primary images and the non-primary images to obtain the feature data to form the trained neural network.

15. The method of claim 14, wherein the method comprises training the neural network to determine authenticity or genuineness of an information bearing device with reference to whether a captured image is a primary image or a non-primary image.

16. The method of claim 14, wherein the neural network is a convolutional neural network (CNN) comprising at least four convolutional layers, wherein the convolutional layers are sequentially connected and each convolutional layer comprises a number of channels defining a plurality of channels, wherein the number of channels of a convolutional layer increases on progressing from the input layer to the output layer, wherein each channel has a number of feature data defining a plurality of feature data, and wherein the number of feature data per channel decreases on progressing from the input layer to the output layer.

17. The method of claim 14, wherein the method comprises using images including imperfect images having varying degrees of image imperfections to train the neural network, and the image imperfections are introduced into the imperfect images in the course of image capture processes or due to different image capture conditions; and wherein the image imperfections comprise imperfections in brightness, contrast, blurriness, image pixel number or dimension, and/or background noise.

18. The method of claim 14, wherein the data-coded image pattern is configured such that the characteristic signal strength of a primary image is above a signal strength threshold and the characteristic signal strength of a non-primary image is below the signal strength threshold.

19. The method of claim 14, wherein the data-coded image pattern is encoded with a set of discrete data, wherein each discrete data of the set of discrete data has a characteristic signal strength and correlates with a set of spatially distributed pattern defining elements of the data-coded image pattern by a domain transformation function, the spatially distributed pattern defining elements being spread in the data-coded image pattern to form a spread image pattern.

20. The method of claim 14, wherein the data-coded image pattern is encoded with a set of discrete frequency data and each discrete frequency data has a characteristic frequency magnitude; wherein the set of discrete frequency data comprises discrete data having different frequency magnitudes and the discrete data having a higher characteristic frequency magnitude are used as a criterion for determining whether a primary image is suitable for training the neural network.

* * * * *